United States Patent
Fernandez-Spadaro et al.

(10) Patent No.: US 11,457,017 B2
(45) Date of Patent: Sep. 27, 2022

(54) SYSTEM AND METHOD OF DETERMING PERSISTENT PRESENCE OF AN AUTHORIZED USER WHILE PERFORMING AN ALLOWED OPERATION ON AN ALLOWED RESOURCE OF THE SYSTEM UNDER A CERTAIN CONTEXT-SENSITIVE RESTRICTION

(71) Applicant: THE WHISPER COMPANY, Austin, TX (US)

(72) Inventors: Alejandro S. Fernandez-Spadaro, Austin, TX (US); Benito R. Fernandez, Austin, TX (US)

(73) Assignee: THE WHISPER COMPANY, Austin, TX (US)

( * ) Notice: Subject to any disclaimer, the term of this patent is extended or adjusted under 35 U.S.C. 154(b) by 0 days.

(21) Appl. No.: 17/192,866

(22) Filed: Mar. 4, 2021

(65) Prior Publication Data
US 2021/0281572 A1 Sep. 9, 2021

Related U.S. Application Data

(60) Provisional application No. 62/985,277, filed on Mar. 4, 2020.

(51) Int. Cl.
*H04L 9/40* (2022.01)

(52) U.S. Cl.
CPC .......... *H04L 63/102* (2013.01); *H04L 63/083* (2013.01); *H04L 63/0861* (2013.01);
(Continued)

(58) Field of Classification Search
CPC ... H04L 63/102; H04L 63/083; H04L 63/108; H04L 63/107; H04L 63/104;
(Continued)

(56) References Cited

U.S. PATENT DOCUMENTS

| 6,724,919 B1 | 4/2004 | Akiyama et al. |
| 6,853,739 B2 | 2/2005 | Kyle |

(Continued)

FOREIGN PATENT DOCUMENTS

WO  WO2007055745  5/2007

OTHER PUBLICATIONS

Masahiro Fujita et al. "Physical Trust-based Persistent Authentication," 2015, pp. 186-190. (Year: 2015).*

(Continued)

*Primary Examiner* — Luu T Pham
*Assistant Examiner* — Canh Le
(74) *Attorney, Agent, or Firm* — Hulsey P.C.

(57) ABSTRACT

A system and a method of determining persistent presence of an authorized user while performing allowed operations on an allowed resource of the system while satisfying certain context-sensitive restrictions are disclosed. The system receives a request from a user to authenticate him/her. The system authenticates the user using biometric information of the user or any other authentication mechanism in a given context-sensitive restriction. If the user is authenticated, then the system allows the user to perform the allowed operation using the allowed resources in the context-sensitive restriction. If the authentication fails indicating that the user is an unauthorized user, then the system initiates a resolution process to halt or terminate the allowed operation to restrict or obfuscate the allowed operation from being accessed by the unauthorized user. In one embodiment, the system comprises an External Companion Device (ECD) paired with the system to perform the authentication and manage the allowed.

22 Claims, 16 Drawing Sheets

(52) U.S. Cl.
CPC .......... *H04L 63/104* (2013.01); *H04L 63/107* (2013.01); *H04L 63/108* (2013.01); *H04L 63/20* (2013.01); *H04L 2463/082* (2013.01)

(58) Field of Classification Search
CPC ................. H04L 63/0861; H04L 63/20; H04L 2463/082; H04L 9/3226; H04L 9/3231; H04W 12/069
See application file for complete search history.

(56) References Cited

U.S. PATENT DOCUMENTS

| | | |
|---|---|---|
| 7,401,235 B2 | 7/2008 | Mowers et al. |
| 7,894,987 B1 | 2/2011 | Tester et al. |
| 8,627,096 B2 | 1/2014 | Azar et al. |
| 2013/0239191 A1 | 9/2013 | Bostick |
| 2016/0100314 A1 | 4/2016 | Chung et al. |
| 2017/0034217 A1* | 2/2017 | Anton ................. G06F 21/6227 |
| 2019/0101909 A1* | 4/2019 | Miller ................... H04L 9/3226 |
| 2019/0354670 A1* | 11/2019 | Adelson ................. G06F 21/44 |
| 2020/0074053 A1* | 3/2020 | Deutschmann ..... G06F 21/6254 |
| 2020/0358787 A1* | 11/2020 | Barker ................ H04L 63/0861 |
| 2020/0389314 A1* | 12/2020 | Kunnath ................. H04L 63/18 |
| 2021/0004588 A1* | 1/2021 | Correa Bahnsen .. G06V 40/197 |

OTHER PUBLICATIONS

Jorge Martinez, "Persistent Authentication in Smart Environments using COTS Hardware," 2017, pp. 1-67. (Year: 2017).*

* cited by examiner

SYSTEM AND METHOD OF DETERMING PERSISTENT PRESENCE OF AN AUTHORIZED USER WHILE PERFORMING AN ALLOWED OPERATION ON AN ALLOWED RESOURCE OF THE SYSTEM UNDER A CERTAIN CONTEXT-SENSITIVE RESTRICTION

FIELD OF INVENTION

The present invention generally relates to computer access control. More specifically, the present invention relates to a system, and a method of determining persistent presence of an authorized user while performing allowed operations on an allowed resource of the system while satisfying certain context-sensitive restrictions.

BACKGROUND OF INVENTION

It is known that privileged access control and management is very important for computer security. It is important to protect the integrity of computer systems and information stored therein. Generally, various authorization schemes and/or access control schemes are implemented to prevent unauthorized users/agents and malicious attackers from gaining access to the computer systems and their resources.

With advent in technology, more people are using various computer systems such as mobile phones, laptops, smart watches and other electronic devices for performing various operations/tasks such as web browsing, emailing, sharing, storing, and accessing information, such as photos, bank accounts, financial data and email/SMS messages, business communication, etc. Although the technology provides great convenience to users, there are growing security challenges in protecting the privacy of the users and data stored in the computer systems. As a result, personal, commercial, intellectual property, and even national security information is potentially vulnerable to unauthorized access and possibly alteration or destruction by the unauthorized users or hackers. As known, the hackers may access the information in the computer systems either by breaching network security or by stealing identity of authorized users. Further, the information accessed by the hackers might lead to inconvenience, potential financial losses, or national security breaches.

In order to reduce the threat of the hackers looking into private information, many operators and developers have added encryption to some of their functions. Typically, two types of encryption i.e., symmetric and asymmetric are used. The symmetric encryption, such as, Advanced Encryption Standard (AES), uses the same key for encryption and decryption. The asymmetric encryption, such as Rivest-Shamir-Adleman (RSA), uses different keys, both public and private. As known, encryption is a process of protecting data confidentiality by converting the data into an unreadable format called a cypher, using an encryption key. The decryption is the reverse process of encryption to uncover the encrypted data, using a decryption key, possibly different from the encryption key. The cryptographic keys are usually long and random, not practical for humans to memorize or discover by brute force using current computing technologies. For example, the AES key is 128 bits long, in accordance with federal information processing standards publication 197, National Institute of Standards and Technology (NIST), 2001. Such cryptographic keys are usually stored in a location, where an alternative authentication, e.g., a PIN or a password is required to release the key, in order to avoid the risk of losing or forgetting the cryptographic key.

In addition to encrypting the information on the computer systems, other operators and developers have enhanced the use of biometric sensors to authenticate the user of the computer systems. The biometric sensors are used to obtain biometric information including human physiological or behavioral characteristics of users or operators and the biometric information might be used to authenticate the users of the computer systems. The biometric information may include, but not limited to, facial features, fingerprint, iris, signature, and voice, among many others. In the past, use of the biometric information was focused on authentication to grant access to computer systems and network access, physical access, time and attendance applications. Often, the biometric information is used in conjunction with other security technologies, such as authentication tokens and smart cards.

Several examples of using biometric information to authenticate the users have been disclosed in the past. For example, biometric authentication using facial recognition is used to gain access to some computer devices or electronic devices. Examples of biometric authentication are disclosed in U.S. Pat. Nos. 6,853,739 and 6,724,919. Above disclosures disclose examples of identity verification systems wherein a database is employed to compare facial features of a user to those in the pre-established database. Once a comparison is made, then authentication is verified, and access is granted to the system. The disadvantage of this type of system is the requirement of a separate and specific enrollment procedure by the user to create the database. As with this type of facial recognition system and others in the prior art, the database must be populated before being used; otherwise, the system will not operate. This puts an unnecessary burden on the end-user and/or the system operator, requiring detailed education on the steps to securely populate the database before the system may become operational. Additionally, this type of security system does not permit the automatic updating of the database to accommodate changes in head position, user features (such as different glasses), a change in the camera's operational characteristics, lighting and other environmental factors. This can limit the speed, accuracy, and even the success of database matching (recognition). Also, the prior art facial recognition and other biometric systems operate only at the instant of authentication. Very few facial recognition systems use machine learning to account for small and progressive variations and adapt over time to improve recognition accuracy.

An example of using screen gesture and facial biometrics for providing secure access to an electronic device is disclosed in a U.S. Pat. No. 8,627,096. In U.S. Pat. No. 8,627,096B2, it is disclosed that a system and method for providing secure authorization to an electronic device by combining two or more security features of authentication process at substantially the same time where at least one of the factors is a "tolerant" factor. By combining two factors such as a facial recognition any screen gesture, these can be analyzed at substantially the same time such that the tolerance match required by the tolerant factors providing a better user authentication experience without reducing the overall security accuracy.

An example of using location for triggering applications is disclosed in a U.S. Pat. No. 7,894,987. In U.S. Pat. No. 7,894,987B1, a method for location-based zone triggering is disclosed. The method includes the step of (A) generating a position signal conveying a location of a device in at least two spatial dimensions in response to a plurality of navigation signals received from external sources by the device and (B) generating a trigger signal at an interface based on the position signal, (i) a first aspect of the trigger signal indicating that the location is crossing a boundary of a zone, (ii) a second aspect of the trigger signal indicating that the device is one of entering the zone and leaving the zone and (iii) the interface adapting a zone module to communicate the trigger signal to an application module.

An exemplary method of providing data encryption and decryption on mobile devices using biometric features, e.g. facial images is disclosed in a United States patent application 20160100314.

Further, an exemplary method for providing persistent biometric authentication for a computer system is disclosed in a United States patent application 20130239191. This method includes steps of collecting behavioral interaction information associated with a user account on the computer system, comparing the behavioral interaction information with a behavioral model associated with the user account; and adjusting an authentication confidence metric based on the comparison.

An example of using facial images for providing security for an electronic device is disclosed in a PCT published application WO2007055745A2.

Another technique for allowing users that are authenticated by a trusted external service to gain controlled levels of access to selected local computing resources without requiring the user to also have conventional access control capabilities for the resources is disclosed in a U.S. Pat. No. 7,401,235B2. It should be understood that the above disclosure will help to provide access to various resources for very large numbers of users and leaves scope for hackers to gain access to the computing resources.

With increase in use of mobile phones, more and more people are communicating using third party applications for sending emails or messages or chatting with peers. Although some of the third-party applications are using encryption techniques to protect the information communicated between peers, they pose few problems. For instance, the third-party applications are generally installed on the computer systems such as mobile phones without any protection. Although existing mobile devices include a feature to authenticate the user either by entering a password or using biometric information such as fingerprint, the mobile device may not know whether the authenticated user is still present and continues to possess the mobile device or that the authenticated user is no longer present or that another person is now present and/or possesses the mobile device. For example, the authenticated user may have stepped away from the mobile device leaving the mobile device "unlocked" and therefore vulnerable. An unauthorized user may then access the mobile device. Once the unauthorized user gains access to the mobile device, the unauthorized user may gain access to the third-party applications.

None of the above discussed prior art disclosures disclose techniques which determines persistent presence of authorized user while operating the computer system to prevent unauthorized access by the unauthorized users such as third parties with physical access to the computer system or the hackers having electronic access to the system. Further, none of the disclosures disclose how to protect the information from being accessed or misused once the hackers are successfully able to breach the authentication mechanism on the computer systems.

Similarly, most encryption methods used in transmitting encrypted information assure security between devices, what is referred to as end-to-end ('in-transit') encryption. But, once the encrypted messages arrive at their destination, they are decrypted and stored locally ('at-rest') decrypted. This represents a vulnerability, such that third parties with physical access to the computer system or the hackers having electronic access to the system will gain access to the unencrypted information.

Consequently, there is a need for improved system that includes a combination of hardware and software that is capable of determining the persistent presence of an authorized user while performing allowed operations on allowed resources of the system while satisfying certain context-sensitive restrictions and securing the information at-rest while the user hasn't been authenticated and the operation on the data validated.

SUMMARY

It is an object of the present invention to provide a system and a method for determining persistent presence of an authorized user while performing allowed operations and that avoids the drawback of known techniques.

In order to achieve the object, the present invention provides a system and a method for determining persistent presence of an authorized user while performing allowed operations on an allowed resource of the system while satisfying certain context-sensitive restrictions.

In one technical feature of the present invention, the system comprises a combination of hardware and software that is capable of determining the persistent presence of the authorized user while performing allowed operations on allowable resources of the devices while satisfying certain context-sensitive restrictions. At first, the system is configured to authenticate a user trying to access the system. The user might be authenticated using biometric information stored in the system or multitude of passwords or any other method as might be configured in the system. The user authentication is performed based on preconfigured accessibility protocol with set of selected methods for authentication, and a plurality of sensors and other context-sensitive restrictions. In order to authenticate the user, the system utilizes a plurality of sensors comprised therein or other authentication procedures such as passwords or Oder multi-factor authentication procedures. The plurality of sensors may include a camera, an accelerometer, a light sensor, a fingerprint sensor, a Global Positioning Satellite (GPS) Sensor, a proximity sensor, a motion sensor, a pulse rate sensor, an audio system, etc. Further, the system comprises additional sensors to establish context such as the location, time, weather, and other conditions that can be used as trigger mechanisms for authorizing the user.

In accordance with one implementation of the present invention, the system is configured such that only certain operations are presented as options in text or graphical format to the authorized user to perform once he is authenticated or validated. In one example, icons of unauthorized applications to be used by the user are not shown on the desktop of a mobile phone or the applications names are not listed in the computer directory.

In accordance with one implementation of the present invention, the system is configured with certain operations that are allowed for the authorized user to perform once he is authenticated or validated. Further, the system is configured with resources upon which the authorized user can perform the operations in the appropriate context. After the user has been authenticated or validated with the details registered with the system in a given context e.g., password and particular time of the day, the authorized user can perform the allowed operation using the allowed resources in the appropriate context. Similarly, the system is configured with different authentication methods to authorize a user and allow him/her to perform certain operations on certain resources of the system under certain context-sensitive restrictions. Further, the system might be configured to perform the authentication either independently or in association with other devices or methods of authentication. Further, each authentication method and operations that are allowed to the authorized user can be preconfigured in the system. The manner of authenticating the user and allowing him/her to perform certain allowed operations can be defined in multiple hierarchical layers such that the user needs to authenticate him/her at each level to perform the allowed operation on the allowed resources under certain context-sensitive restriction.

If the user is authenticated, then the system allows the user, to view and/or gain control to the user's authorized operations assigned to the user and continue with the set of authorized operations assigned to the user on the allowable resources under allowed context-sensitive restriction, while the system determines persistently and continuously that the authorized user is present. If the system determines that user persistent authentication has failed at any of the hierarchy layers of the authentications/authorizations, then the system may initiate a resolution process in that layer based on the accessibility protocol predetermined. Similarly, the system determines user authentication at each hierarchy layer and if it fails, the system initiates the resolution process recurrently over the rest of the layers. If at any level, the system determines that authentication of the user has failed, then the system initiates the resolution process to take necessary steps to protect the information, the resource, and operation from being accessed by the user. In one example, the system might be configured to initiate a resolution process such as halting or stopping access to the allowed operation or obfuscating the information i.e., blurring/erasing the region of the screen where the information is shown, or the entire screen, or putting an image covering the region or screen where the information is being shown, or display a cypher instead of sensitive text or information. In one example, if the information contains sound, e.g., voice message or video, the sound volume may be reduced to zero, mixed with noise at a high gain noise to signal ratio, play a different pre-recorded sound, or stop the audio component to be heard.

In one implementation, the accessibility protocol may require persistent biometric authentication of a user or set of users, geolocation information, ability to connect to a set of authorized networks, range of times during certain days, a set of authorized users present, etc. The settings of the accessibility protocol might be preconfigured in the system by an administrator. In one example, the accessibility protocol includes a dictionary with a set of authorized users, what operations can be performed on the devices by these users, on what resources, and under what contextual conditions. In one example, the accessibility protocol includes resolution mechanisms such as what operations are performed when an unauthorized user tries to perform an operation, or when the operation is not unauthorized to the user, or when the authorized user tries to perform an authorized operation on an unauthorized resource, or under unauthorized context. Additionally, the accessibility protocol includes different levels i.e., hierarchical nature of the authentication framework such that only certain authorized users are allowed to perform certain actions on the system.

In one technical advantageous feature of the present invention, the system initiates a resolution process upon determining that the user is not the authorized user i.e., an authorized user such that the necessary steps are taken to secure the information from being accessed by the unauthorized user. This will make that information is secure and not vulnerable by digital information compromises, hardware breach, or unauthorized users access to the system.

In another implementation, the system might be used with an External Companion Device (ECD) for authenticating users to perform certain allowed operations over certain resources on the device under certain contexts. The ECD may include an electronic device communicatively connected to the system over a short or long range wired or wireless protocol. In one example, the ECD can be used as wearable device, e.g., a watch, a concealed device, a pendant etc. by the user of the system. The ECD might be provided with a plurality of biometric sensors that can sense a multitude of biometric information of the user. Additionally, the ECD might be provided with sensors to establish contextual information about the location, time, weather, and other conditions that can be used as trigger mechanisms for an authentication scheme.

In another implementation, the system might have, as a triggering mechanism to invalidate the user, one of a set of predetermined gestures or actions by the authorized user, recognizable by the system from the sensors and their processing. In an example, the user may be forced to operate the system against the user's will, e.g., kidnapped or forced at gunpoint. The conflict resolutions may include notifying a third party, like a manager, security firm or law enforcement; start recording audio and/or video, and whenever and wherever possible stream these to third parties, based on a predetermined resolution process protocol.

In order to authenticate a user for perform certain allowed operations over certain resources on the device under certain contexts with the help of the ECD, the user might be authenticated at the ECD. As specified above, the ECD comprises the plurality of biometric sensors for receiving biometric information of the user. Further, the ECD may use the additional sensors to obtain the contextual information. When the user tries to authenticate him/her, an authentication module comprised in the ECD may obtain biometric information of the user and compare it with stored biometric information. If the authentication module of the ECD determines that the biometric information match, then the ECD may send the determination to the system. Subsequently, the system may verify the determination made by the ECD and allow the authorized user to perform allowed operations on the system.

After the user is authenticated based on a match between the sensed and stored biometric information of either the ECD or the system, each of the authentication module of the ECD, and the system continually performs additional comparisons between their sensed and biometric information, and the contextual information to maintain the ability of the user to perform the allowed operations on the authorized resources. While the authentication is maintained, the authorized user is allowed to perform the allowed operation on the allowed resources. If the authentication fails i.e., if the system determines that biometric information shared by the ECD does not match with stored biometric information in the system, then the authorization to perform the allowed operation is revoked and countermeasures such as the resolution processes are initiated to guarantee confidentiality and integrity of the information.

It one advantageous feature of the present invention, the system ensures that the authorized user is trying to authenticate himself/herself to access the system, and further ensures that the authorized user is performing only the allowed operations on the system. If the authentication of the user fails, then the system ensures that the user does not get access to the system. Even if an unauthorized user bypasses the authentication mechanism by stealing identity of an authorized user, and tries to perform an operation that is not allowed for the authorized user, then the system halts or terminates the operation by taking countermeasures or resolution processes such that the unauthorized user will not be able to view or perform any other operation on the information stored in the system.

Features and advantages of the subject matter hereof will become more apparent in light of the following detailed description of selected embodiments, as illustrated in the accompanying FIGURES. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

Figure 1:
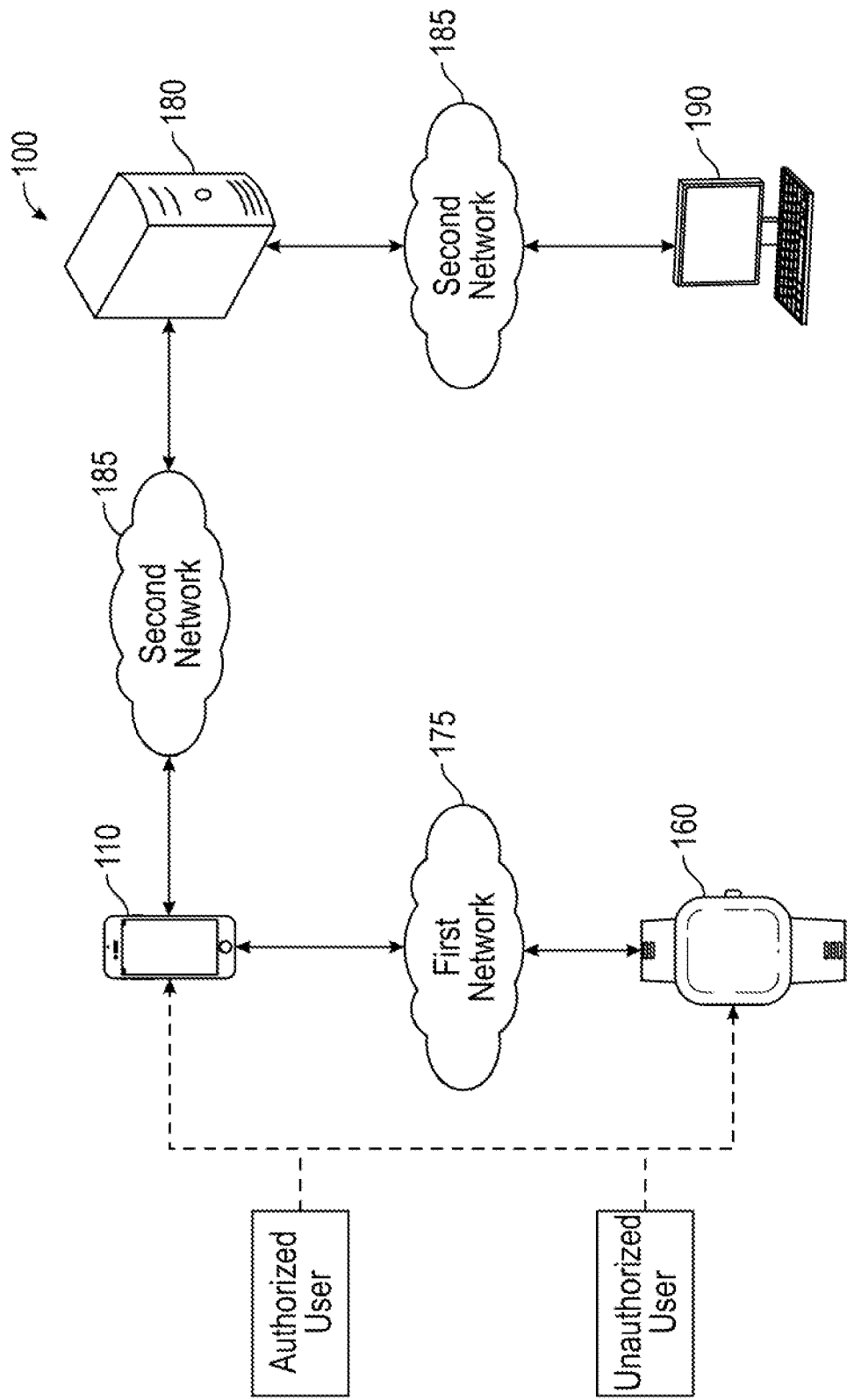
FIG. 1 illustrates an environment 100 in which a system 110 for determining persistent presence of an authorized user while performing allowed operations on an allowed resource of the system while satisfying certain context-sensitive restrictions is implemented, in accordance with one embodiment of present invention.

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of a system and method of determining persistent presence of an authorized user while performing an allowed operation on an allowed resource of the system under a certain context-sensitive restriction, it should be understood that the description is by way of example only and is not to be construed in a limiting sense. It is to be further understood that numerous changes may arise in the details of the embodiments of this system, and a method of determining persistent presence of an authorized user while performing allowed operations on an allowed resource of the system while satisfying certain context-sensitive restrictions. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

It should be understood that the present invention describes a system and a method of determining persistent presence of an authorized user while performing allowed operations on an allowed resource of the system while satisfying certain context-sensitive restrictions. The system receives a request from a user to authenticate him/her. The system authenticates the user using biometric information of the user or any other authentication mechanism in a given context-sensitive restriction. If the user is authenticated, then the system allows the user to perform the allowed operation using the allowed resources in the context-sensitive restriction. If the authentication fails indicating that the user is an unauthorized user, then the system initiates a resolution process to halt or terminate the allowed operation to restrict or obfuscate the allowed operation from being accessed by the unauthorized user. In one embodiment, the system comprises an External Companion Device (ECD) paired with the system to perform the authentication and manage the allowed operations on the resources of the system under the context-sensitive restriction.

Various features and embodiments of the system for determining persistent presence of an authorized user while performing allowed operations on an allowed resource of the system while satisfying certain context-sensitive restrictions are explained in conjunction with the description of FIGS. 1-13.

In one embodiment, the present invention discloses a system for determining persistent presence of an authorized user while performing allowed operations on an allowed resource of the system while satisfying certain context-sensitive restrictions. FIG. 1 shows an environment 100 in which a system 110 is implemented. The environment 100 comprises the system 110, an External Companion Device (ECD) 160, a server 180, and at least one remote device 190. As can be seen, the system 110 and the ECD 160 are communicatively connected via a first network 175. Alternatively, the system 110 and the ECD 160 may communicate via a hardwired connection via one of many communication protocols like serial: RS232, RS485, RS422, I2C, USB, ModBus RTU, Filedbus: DeviceNet, CANopen, etc. The system 110, the server 180, and the at least one remote device 190 are communicatively connected via a second network 185. In one implementation, there may include a sequence of networks that may include different protocols, routers, switches, etc. that are represented by 185.

The system 110 might include an electronic device such as a mobile phone, a laptop, a tablet, a computer and so on. The system 110 might comprise hardware and/or one or more applications configured to execute functions for authenticating a user and allowing the user to perform allowed operations on allowed resources while satisfying the context-sensitive restrictions. In alternative embodiments, the system 110 operates as a standalone device or may be connected (e.g., networked) to other systems.

Figure 2:
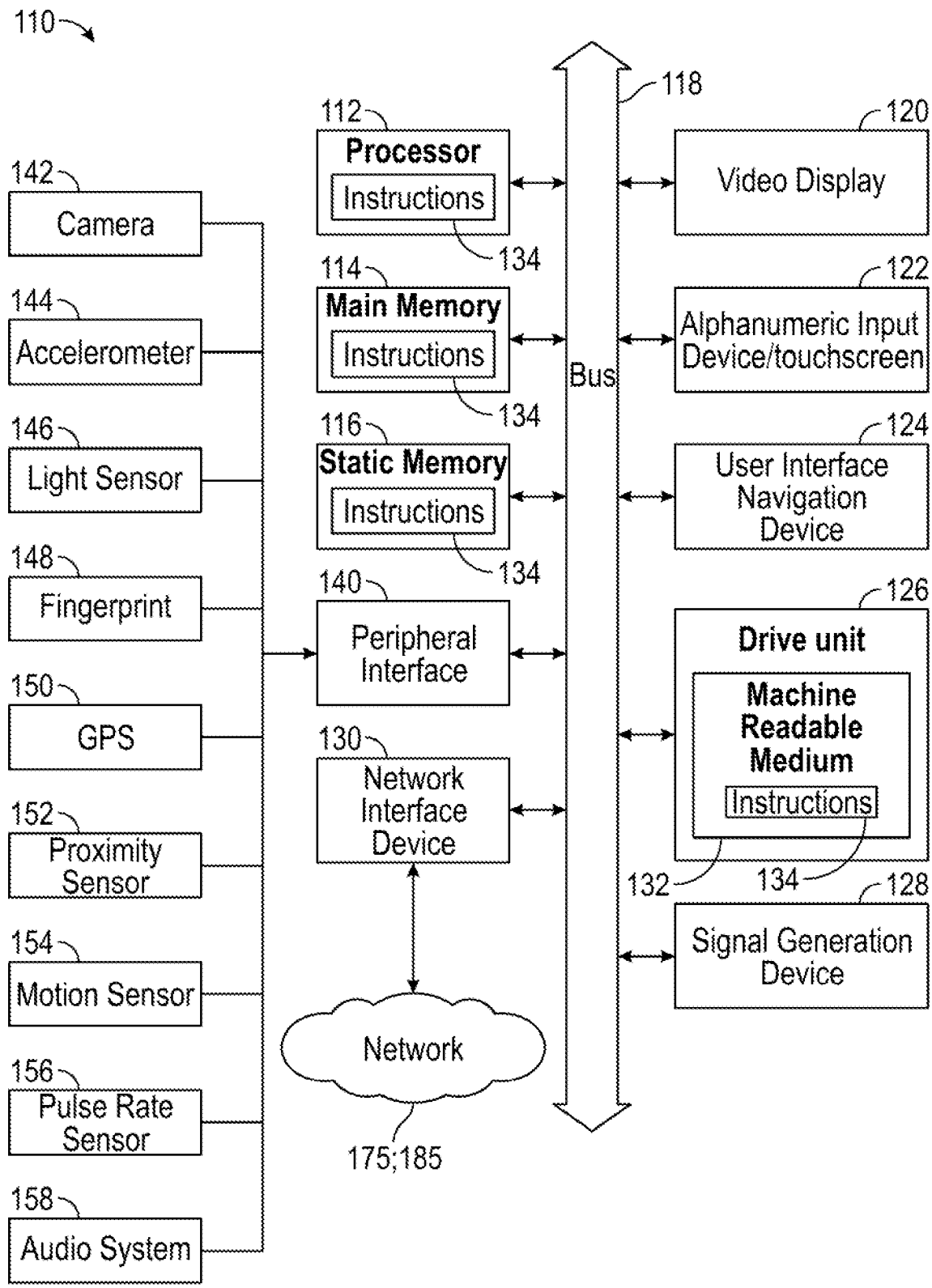
FIG. 2 illustrates a diagrammatic representation of the system 110, in accordance with one embodiment of present invention.

Referring to FIG. 2, a diagrammatic representation of the system 110 is shown, in accordance with one embodiment of present invention. The system 110 comprises a processor 112 (e.g., a central processing unit (CPU), a graphics processing unit (GPU) or both, field programmable gate array (FPGA), field programmable analog array (FPAA), application specific integrated circuit (ASIC), programmable logic controller (PLC), mixed-signal circuitry, or a combination of any of them), a main memory 114 and a static memory 116, which communicate with at least one other via a bus 118.

The processor 112 may include any suitable processing device, such as a microprocessor, microcontroller, integrated circuit, logic device, or other suitable processing device.

The main memory 114 may include one or more computer-readable media, including, but not limited to, non-transitory computer-readable media, RAM, ROM, hard drives, flash drives, or other memory devices. The main memory 114 may store information accessible by the processor 112, including computer-readable instructions 134 that can be executed by the processor 112. The instructions 134 can be any set of instructions that when executed by the processor 112, cause the processor 112 to perform operations.

In one example, the main memory 114 can be used to store data that can be retrieved, manipulated, created, or stored by the processor 112. The data may include, for instance, organizational data, occupants' data, zone data, and other data.

The bus 118 provides a mechanism for letting the various components and subsystems of system 110 communicate with each other as intended. Although the bus 118 is shown schematically as a single bus, alternative embodiments of the bus 118 may utilize multiple buses. The bus 118 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The system 110 may further include a video display unit 120 (e.g., a liquid crystal display (LCD) or a cathode ray tube (CRT)). The system 110 further includes an alphanumeric input device (e.g., a keyboard) and/or a touchscreen 122, a user interface (UI) navigation device 124 (e.g., a mouse), a disk drive unit 126, a signal generation device 128 (e.g., a speaker), a network interface device (NIC) 130, and a peripheral interface adapter (PIA) 140.

The disk drive unit 126 includes a machine-readable medium 132 on which is stored one or more sets of instructions and data structures (e.g., software 134) embodying or utilized by any one or more of the methodologies or functions described herein. It should be understood that the term "machine-readable medium" might be taken to include a single medium or multiple medium (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals.

The instructions 134 may also reside, completely or at least partially, within the main memory 114 and/or within the processor 112 during execution thereof by the system 110, the main memory 114 and the processor 112 also constituting machine-readable media. The instructions 134 may further be transmitted or received over the first network 175 or the second network 185 via the network interface device 130 utilizing any one of a number of well-known transfer protocols or a custom protocol.

The system 110 further comprises a plurality of peripheral devices or sensors connected to the peripheral interface 140. The plurality of sensors may include a camera 142, an accelerometer 144, a light sensor 146, a fingerprint sensor 148, a Global Positioning Satellite (GPS) Sensor 150, a proximity sensor 152, a motion sensor 154, a pulse rate sensor 156, and an audio system 158. It should be understood that each of the camera 142, the accelerometer 144, the light sensor 146, the fingerprint sensor 148, the GPS Sensor 150, the proximity sensor 152, the motion sensor 154, the pulse rate sensor 156, and the audio system 158 senses or captures respective data and sends them to the processor 112 for processing and then to the main memory 114 for storing the data.

The camera 142 includes an optimal instrument capable of recording images or videos. The camera 142 captures images or videos and transmits them to the main memory 114 for lateral retrieval.

The accelerometer 144 includes an electromechanical sensor capable of measuring acceleration forces acting on the system 110 and possible velocities and orientation information of the system 110.

The light sensor 146 includes a sensor for capturing ambient light falling or facing the system 110.

The fingerprint sensor 148 includes an optical or pressure sensor capable of recognizing the fingerprint of a human being.

The Global Positioning Satellite (GPS) Sensor 150 includes a sensor used to determine the geolocation of the system 110 using satellites. Additionally, geolocation (especially inside buildings, where satellite pointing is limited or not available) can be approximated by the system 110 distances from nearby cell or radio antennae (like GSM-Global System for Mobile communications) towers or routers with known locations.

The proximity sensor 152 includes a sensor capable of detecting presence of nearby objects without any physical contact. The proximity sensor 152 may emit an electromagnetic field or a beam of electromagnetic radiation (infrared, for instance), and looks for changes in the field or return signal to detect presence of nearby objects. Similarly, other means (like acoustic/sonar for instance) may be used to estimate proximity information.

The motion sensor 154 includes a sensor capable of detecting movement of the system 110.

The pulse rate sensor or heart beat sensor 156 includes a sensor configured to provide digital output of heartbeat when a finger of the user is placed on it.

The audio system 158 may include a microphone capable of recording voice of a user of the system 110.

Although it is presented that the system 110 comprises the plurality of sensors such as the camera 142, the accelerometer 144, the light sensor 146, the fingerprint sensor 148, the GPS Sensor 150, the proximity sensor 152, the motion sensor 154, the pulse rate sensor 156, and the audio system 158, the system 110 may further comprise additional sensors. The additional sensors may include sensors used for establishing contextual information about the location, time, weather, and other conditions of the system 110 and its environment that can be used as trigger mechanisms for an authentication scheme. In one implementation, the peripheral devices mentioned above (142-158) may be passive or include processing hardware and/or software (CPU, GPU, FPGA, etc.) and communication circuitry.

Referring back to FIG. 1, the system 110 is communicatively connected to the ECD 160 via a first network 175. The ECD 160 may indicate an electronic device used as an associated device to access the system 110. The ECD 160 might include a wearable device or portable device such as a smart watch. Alternatively, the ECD 160 may include as a pager-like device, a pendant, or as a second screen incorporated in an electronic device case. The ECD 160 might be provided in small size such that the ECD 160 might be used as a concealed device i.e., user of the system 110 might carry the ECD 160 in a pocket or purse. For example, consider that the system 110 is a mobile phone, which the user may carry; the ECD 160 may include a smart watch worn by the user. The ECD 160 is paired with the system 110 to perform allowed operations.

Figure 3:
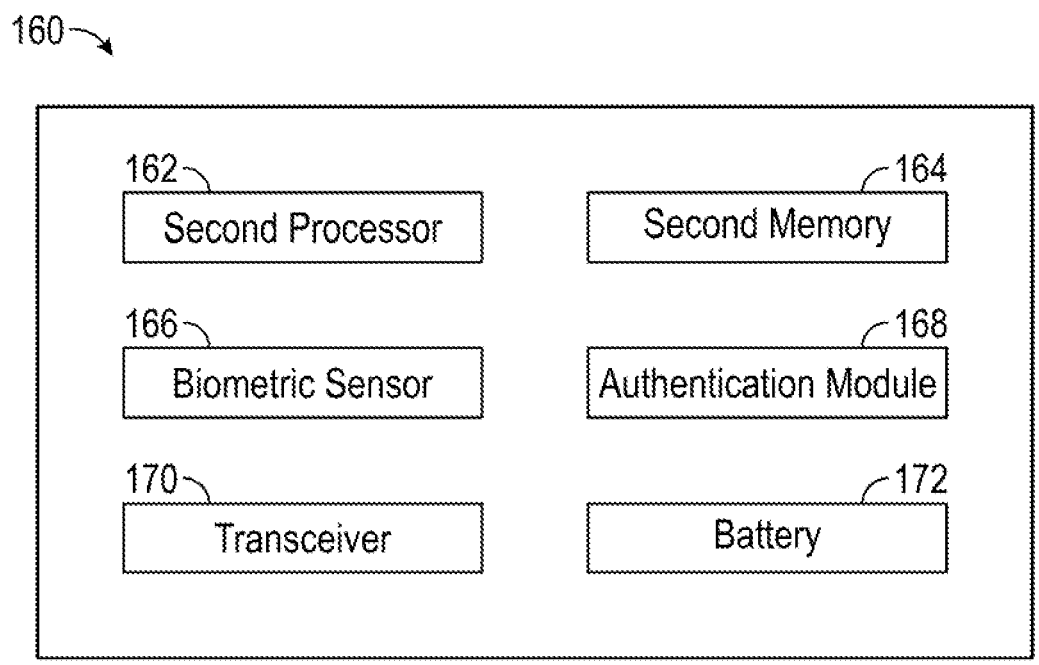
FIG. 3 illustrates a block diagram of an External Companion Device (ECD) 160, in accordance with one embodiment of the invention.

Referring to FIG. 3, a block diagram of the ECD 160 is shown, in accordance with one embodiment of present invention. The ECD 160 may comprise one or more second processor(s) 162, a second memory 164, at least one biometric sensor 166, other additional sensors, an authentication module 168, a transceiver 170 and a battery 172. The second memory 164 might be used to store program instructions. The second processor 162 might be configured to execute the program instructions stored in the second memory 164.

The at least one biometric sensor 166 may include a sensor such as a camera, an accelerometer, a light sensor, a fingerprint sensor, a Global Positioning Satellite (GPS) Sensor, a proximity sensor, a motion sensor, a pulse rate sensor, and an audio system. The at least one biometric sensor 166 might be used to capture or sense biometric information of the user.

The authentication module 168 may include a set of instructions that might be used to verify the biometric information captured by the at least one biometric sensor 166 with that of the biometric information stored in the second memory 164. In one embodiment, the at least one biometric sensor 166 may comprise an integrated firmware to authenticate the user, and means to communicate with the processor 120, and the program instructions in the secondary memory 164 just to validate results obtained or captured by the at least one biometric sensor 166.

The transceiver 170 might indicate a device or component configured to transmit and receive data from the ECD 160 to other devices e.g., the system 110.

The battery 172 may include a rechargeable battery such as Lithium-Ion battery to power the ECD 160.

The first network 175 may include a short-range wireless network such as a Bluetooth, ZigBee, Radio-frequency Identification (RFID), beacons, Near Field Communication (NFC) and so on. As specified above, the ECD 160 is communicatively connected to the system 110 via the first network 175. In the above where the ECD 160 is a smart watch, the ECD 160 might be connected to the system 110 using Bluetooth or RFID.

The server 180 may indicate a database or mainframe used for storing the data processed by the system 110 and facilitate users to access the system 110 using the at-least one remote device 190.

The at-least one remote device 190 may indicate an electronic device such as a mobile phone, a desktop, a laptop, a tablet and so on. The at-least one remote device 190 might be situated remotely from the system 110 such that users may wirelessly access the system 110 via the server 180 and the second network 185.

The second network 185 may include a wireless network, a wired network or a combination thereof. The second network 185 can be implemented as one of the different types of networks, such as intranet, local area network (LAN), wide area network (WAN), the internet, and the like. The second network 185 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the second network 185 may include a variety of network devices, including routers, bridges, servers, computing devices, storage devices, and the like.

Figure 14:
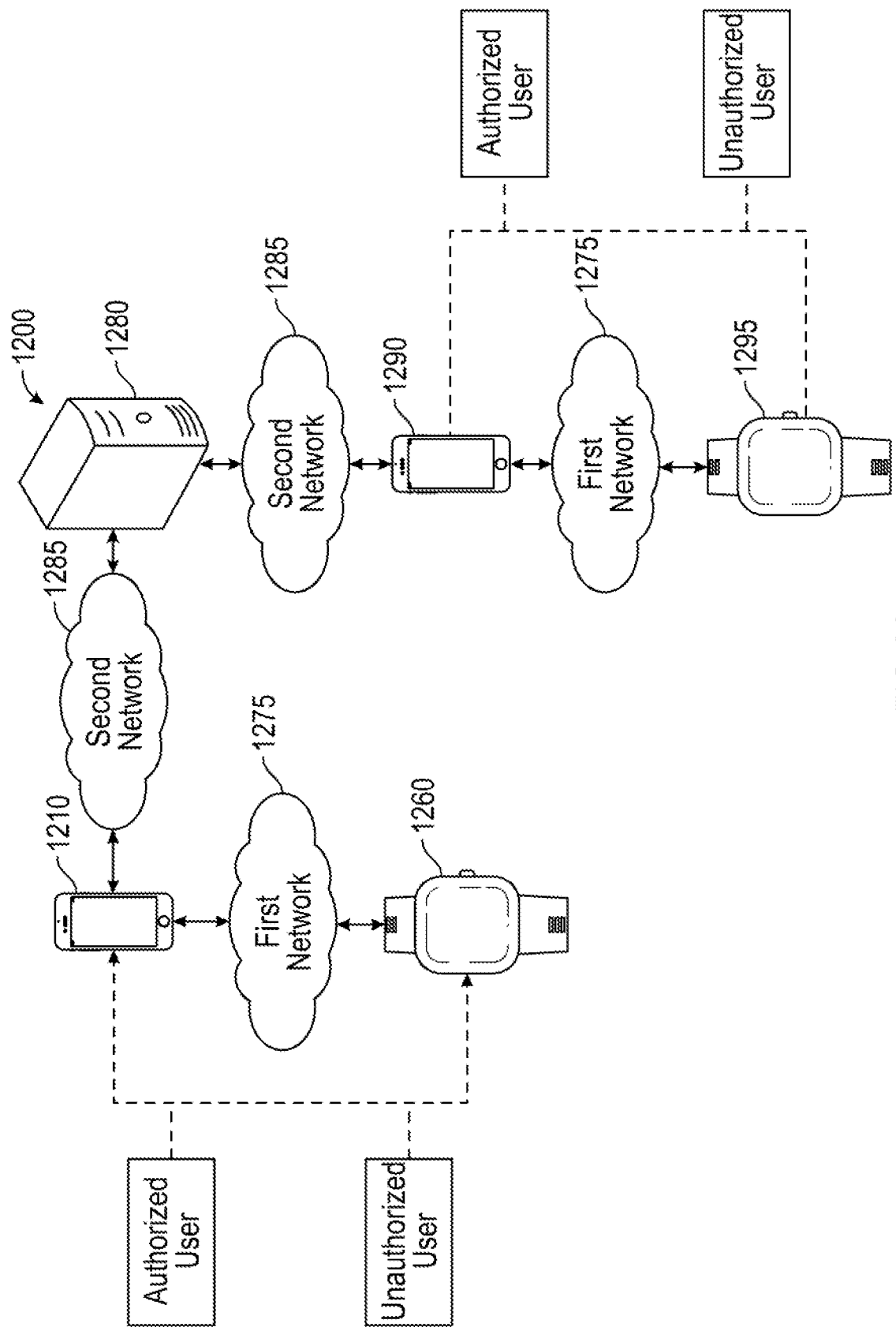
FIG. 14 illustrates an environment 1200 in which two systems 1210/1290 are communicating via global network 1285. Each system 1210/1290 and their companion device 1260/1295 are capable of determining persistent presence of an authorized user while performing allowed operations on an allowed resource of the system while satisfying certain context-sensitive restrictions is implemented, in accordance with one embodiment of present invention.

In one implementation, the at least one remote device 190 may include a plurality of devices similar to the left of FIG. 1, comprising of a secondary device (similar to 110) with local network (similar to 175) and possibly a secondary external companion device (similar to ECD 160) as shown in FIG. 14. The at least one remote device 190 may also have persistent user authentication firmware to authenticate the persistent presence of its authorized user(s) while performing allowed operations (locally or remotely) on allowed resources while satisfying certain context-sensitive constraints.

As specified above, the system 110 is configured to determine the persistent presence of an authorized user while performing allowed operations on an allowed resource of the system 110 while satisfying certain context-sensitive restrictions. In order to configure the system 110, at first, the system 110 might be operated by an administrator or a manager to pre-determine or pre-configure data corresponding to users who will be authorized to access the system 110 and perform operations that are authorized/allowed to him/her in an appropriate context. The administrator may include an individual who is an owner or authorized to configure the system 110. As such, the system 110 might be pre-configured with a set of instructions, data embedded in the memory 114 and a plurality of sensors capable of identifying users, the allowed operations each user is allowed to perform, on which resource(s) and under which context-sensitive constraints, and instructions of how to process the data operated on the resources. As specified above, the system 110 comprises the plurality of sensors capable of detecting biometric information of the user. For example, the system 110 might be configured to employ a sensor e.g., fingerprint sensor 148 for obtaining fingerprint data of the user. In another example, the system 110 might be configured to employ the camera 142 for capturing facial features of the user for recognizing the user. Similarly, the system 110 might be configured to capture a variety of biometric information of the user.

Further, the system 110 might be configured with an authentication scheme or authentication mechanism for recognizing or authorizing the user to access the system 110. In order to configure system 110 with the authentication mechanism, at first, system 110 may capture the biometric information of the user. For example, the system 110 might be configured to prompt the user to register using his fingerprint. In order to register, the user may use the fingerprint sensor 148 to provide his fingerprint and register with the system 110. In another example, the system 110 might be configured to prompt the user to register using voice. In order to register, the user may use the audio system 158 to provide his voice sample and register with the system 110. Similarly, the system 110 might be configured to register the user with his different biometric information such as Facial recognition, retinal scan, and so on. Further, the system 110 might be configured to register the user using his different methods such as passcodes or passwords, facial or hand gestures, device gesture (gestures using accelerometer 144), signature, and so on.

After receiving the biometric information of the user, the system 110 might store the specific data associated with each sensor and the corresponding reference/signature (to be used for comparison during authentication) locally in the system's 110 static memory 116 that is protected (like a secure enclave) that only the operating system (OS) of system 110 is capable or retrieving for authentication purposes. It may also be stored remotely in the server 180, encrypted such that only the user of the system 110 can successfully retrieve it.

After receiving the biometric information of the user, the system 110 might be configured to determine an authentication mechanism for identifying or authorizing the user to access the system 110. For example, the system 110 might be configured to authenticate the user using the authentication mechanism such as fingerprint identification. For the above example, whenever the user wishes to access the system 110, the system 110 might prompt him/her to use his fingerprint to authenticate him/her and subsequently provide access to the system 110. Similarly, the system 110 might be configured to authenticate the user using other authentication mechanisms such as facial recognition, retinal scan, passcodes or passwords, facial or hand gestures, device gesture (using accelerometer 144), signature, and so on. It should be understood that the system 110 might be configured to identify or authorize the user using multiple authentication mechanisms such that in case one type of authentication mechanism fails, then the system 110 might prompt the user to authenticate him/her using another authentication mechanism. Further, it should be understood that whenever the user tries to access the system 110, the system 110 employs a corresponding sensor based on the authentication mechanism assigned for the user and authenticates or verifies his details.

Further, the system 110 might be configured with an "accessibility protocol". The accessibility protocol may indicate a set of instructions comprising conditions upon which the system 110 is configured for allowing each user to access and perform allowed operations on the system 110. In one example, the administrator may specify the accessibility protocol for the user. In one implementation, the system 110 might be configured with an accessibility protocol that requires persistent biometric authentication of a user or set of users, geolocation information, ability to connect to a set of authorized networks, range of times during certain days, a set of authorized users present, etc. In another implementation, the accessibility protocol includes a dictionary with a set of authorized users, what operations can be performed on the system by the users, on what resources, and under what contextual conditions. In another implementation, the accessibility protocol includes resolution mechanisms such as what operations are performed when an unauthorized user tries to perform an operation, or when the operation is not unauthorized to the user, or when the authorized user tries to perform an authorized operation on an unauthorized resource, or under unauthorized context.

Additionally, the accessibility protocol includes a set of selected methods to be used for authenticating the user, one or more sensors to be used for authenticating the user, the frequency of validation, and the sequencing of methods used. The system 110 is configured with the accessibility protocol to ensure that the information stored in the system 110 is secure and not vulnerable by digital information compromises, hardware breach, or unauthorized users access to the system 110.

Further, the system 110 is configured with a list of users who is allowed to access the system 110 and perform operations i.e., accessing the information stored in the system 110, adding or deleting information, using or running or closing an application, sensing or reading messages, making or answering a phone or video call, reading or modifying a setting of the system 110, taking or erasing of a picture and so on. In order to configure the list of users allowed to access the system 110, either the information corresponding to the users such as name, identification number, level of hierarchy might be stored in the system 110. Further, the user might be prompted to register with the system 110 using any one of the authentication mechanisms presented above.

Further, the system 110 might be configured with operations that each user can perform after authenticating using one of the authentication mechanisms registering with the system 110 for the user. The operation may include, but not limited to, turning ON/OFF the system, using or running or closing an application in the system, opening a document, sending or reading a message, making or answer a phone video call, reading or modify a setting of the system, taking or erasing a picture, etc. It should be understood that other operations that are commonly performed in an electronic device are within the scope of the operation defined in the present invention.

Further, the system 110 might be configured with a resource or multitude of resources upon which the user is allowed to perform the operation. The resource is indicative of information and/or object of action or object of the operation. For example, consider "view message" is an operation that is allowed for the user, then "view Jonas messages" is the resource allowed for the user.

Further, the system 110 might be configured with a certain context-sensitive restriction upon which the user is allowed to perform the operation on the resource allowed on the system 110. In one example, the context-sensitive restriction may include, but not limited to, location, date, time, weather, and other conditions.

Before explaining the determination of the authorized user performing allowed operations on an allowed resource of the system while satisfying certain context-sensitive restrictions, the terminologies used herein are explained with an example. Consider a user named John Smith who is a registered user attempting to perform an operation of "view message" in a given resource (data) "view Mary Jones messages" at a particular time of the day. In accordance with the present invention, the user who authenticates using the one of the authentication mechanisms e.g., facial recognition specified for him ("John Smith") and accesses the system 110 is an "authorized user". If the user fails to authenticate, then the user is referred to as an "unauthorized user" indicating that he is not an authorized user (e.g., "Mary Jones") or a hacker. The operation the user is attempting to perform is i.e., "view message" hereinafter referred as "allowed operation" since he is allowed to perform the operation; and the operation in the given resource (data) is allowed "view Mary Jones messages" is hereinafter referred as "allowed resource", and the context i.e., date or location in which the operation being performed is referred as "context-sensitive restriction". In the present description the terms "authorized operation" and "allowed operation" is used interchangeably, and as such they should be considered to mean one and the same.

As specified above, the accessibility protocol includes a dictionary (or similar data structure) with a set of authorized users, what operations can be performed on the devices by these users, on what resources, and under what context-sensitive restrictions. As such, the system 110 is configured with the list of authorized users, what operations can be performed on the devices by these users, on what resources, and under what context-sensitive restrictions (contextual conditions).

As known, the users might be configured in a hierarchical level to provide access depending on the sensitivity of the information or based on their qualification of experience. As such, the system 110 might be configured with the hierarchy of authentications for each user, an operation which each authorized user is allowed to perform in each level on the allowed resource under given context-sensitive restrictions. For example, consider that the first level of the hierarchy is to test for the user's authorization. If the user is authorized, then the next level in the hierarchy is to check whether or not the user is authorized to perform a given operation. If the user is allowed to perform the operation the next test is to validate that the user can perform the requested operation on a given resource, then the next level in the hierarchy is to check the context-sensitive restrictions. If allowed, indicating that all conditions are met, the operation is performed.

As such, the authentication might be performed at different levels, and each level may have its own context-sensitive restrictions. For example, "John Smith" may be authorized to turn ON the device or system 110 any time, but can only edit documents in a restricted folder during office hours (date-time restriction) at the office (geolocation restriction). At the same time, he (John Smith) can send personal (not to company employees) messages outside office hours. First, the user is checked if he is allowed to perform certain action(s) on device(s). The action being the type of operation. Further, the resource is the information and/or object of action under the conditions—when/where authorized users can perform operation(s) on information and time—when operation(s) on information is/are allowed and Location—where operation(s) on information is/are allowed.

Based on the user, the authentication for the user can be grouped in a tuple or dictionary. In other words, the authentication elements can be grouped together for multi-factor (primary, secondary, tertiary or more) authentication and/or authorization and can be a multi-step (initiation and persistent) authentication creating a sequence of methods according to a group of predefined settings. In one example, the authentication can be grouped as:

(user, operation, information, time, location, . . . ) or {user: {operation: {information: {time: {location: { . . . }}}}}}

For example:

{John: (read, text_message, any_time, any_where), (send, text_message, work_hours, @US)} or (John, read, text_message, any_time, any_where)
(John, send, text_message, any_time, @office)
also,
{Juan: (read, text_message, @office), (send, text_message, work_hours,)}

It should be understood that the system 110 might be configured to include the accessibility protocol for each of the operations or applications that are to be operated in the system 110 by the authorized users. As each operation or application will have its own logical variable, the system 110 might be configured to include the accessibility protocol to perform the operation or access applications. For example, the administrator may preconfigure Persistent User Authentication (PUA) associated with a particular application e.g., Messaging App or at the operating system (OS) level. If at the OS level, switching between applications may require authorization as well, but should be able to "carry on" using the already going authentication (PUA) across authorized applications. As such, the system 110 might be configured to authenticate the authorized user once and might be allowed to perform two or more allowed operations on the respective allowed resources while satisfying the context-sensitive restrictions.

In addition, the system 110 might be configured to include the accessibility protocol that-how an initial authentication scheme, i.e., how the user trying to access the system 110 for the first time is performed. Similarly, the system 110 might be configured to define how secondary or tertiary authentication schemes are performed to perform allowed operations on the allowed resources. Further, the system 110 may require different authentication mechanisms (sensors, requirements) at different levels of the hierarchy or for specific (restricted, sensitive, secret) resources. Similarly, the system 110 may require for the user to perform certain operations, for other users (administrator or supervisor) to authorize such operations-each with its proper authentication mechanism. Further, the system 110 might be configured to include the accessibility protocol such that the certain users may temporarily be disabled to authenticate themselves using the resources. In one example, the administrator may disable context-sensitive or certain biometric sensors required to authenticate the users. This may be applied if one of the sensors fails to function properly.

Further, the system 110 might be configured with the accessibility protocol comprising a resolution process. The resolution process is a process that the system 110 is configured to perform certain operations when an unauthorized user tries to perform an operation, or when the operation is not unauthorized to the "system-authorized" user, or when the authorized user tries to perform an authorized operation on an unauthorized resource, or under unauthorized context. The resolution process might be initiated at any of the hierarchy layers of authentications/authorizations fails, indicating that a user who is not authorized to use the system i.e., an unauthorized user is trying to access the information on the system 110. In one example, when the operation is not allowed or authorized, depending on the accessibility protocol, one of several possible resolutions might be initiated. For example, if as part of the operation information is visualized (display, sound, vibration, etc.), the information might be encrypted, or a preferred method of obfuscation is used to prevent the unauthorized user from accessing the information.

In one example, the resolution process may include displaying information as a cypher of original information, or the information is no longer available to be displayed. The resolution process is initiated to protect the information to be displayed to an unauthorized user. For example, the window where the data is displayed might be made black, or an image can be displayed on top, or a fake message might be displayed, or a message that warns that the operation (display) is not authorized, etc. be displayed. The administrator may configure the accessibility protocol for availability of the information on the resource and what happens to the information based on the user, the resource and the context. In one example, the resolution process might be configured such that the data is removed from the system 110, and a message is sent to the administrator to take necessary steps to protect the information, and to prevent access to the unauthorized user.

Further, the system 110 might be configured with details of the ECD 160. In one example, the administrator may configure unique identification of the ECD 160, communication protocol used to communicate with the ECD 160, time, location of the ECD 160, operations the user can perform on the system 110 after the user is authenticated via the ECD 160, sensors of the system 110 that the users can access, hierarchical nature of the authentication framework such that only certain users are allowed to perform certain actions on the system 110 and so on. The details of the ECD 160 is configured to pair the ECD 160 with the system 110 and to further allow the user to access or perform allowed operations on the system 110 after being authenticated using the ECD 160.

After configuring the details of the ECD 160 in the system 110, the administrator may configure the ECD 160 with the details of the user and his accessibility protocol. In one embodiment, the ECD 160 might be used to authenticate the user as a first level authentication mechanism before he is allowed to access the system 110. As such, the accessibility protocol of the user is stored in the second memory 164 of the ECD 160.

Although it is explained that the administrator may configure the system 110 with details of the ECD 160, it is obvious to a person skilled in the art to get the ECD 160 certified by a trusted external service to use the ECD 160 as companion device or trusted device to allow access to the user to perform authorized operations at the system 110. After configuring, the details of the ECD 160 are stored in the main memory 114.

In order to authenticate the user via the ECD 160, the system 110 might be configured in a way that the user will be authenticated at the ECD 160 using the biometric sensor 166 with the help of the authentication module 168. In such a scenario, the authentication module 168 might authenticate the user by obtaining the biometric information from the biometric sensor 166. Subsequently, the authentication module 168 may compare the biometric information with the biometric information stored in the second memory 164. If the user biometric information matches with the stored biometric information, then the ECD 160 may communicate to the system 110 that the user is authenticated. After authentication, the system 110 might allow the user to perform the authorized operations on the system 110.

In one alternate embodiment of the present invention, the system 110 might be configured with details of the remote device 190. In one example, the system 110 might be configured with unique identification of the remote device 190, communication protocol used to communicate with the remote device 190, time, location of the remote device 190, the authorized operations the user can perform on the system 110 after the user is authenticated when accessed through the remote device 190, sensors of the system 110 that the users can access to authenticate themselves, hierarchical nature of the authentication framework such that only certain users are allowed to perform certain actions on the system 110 on allowed resources under certain context and so on. The details of the remote device 190 are configured in the system 110 such that the processor 112 allows the user to access or perform authorized operations on the system 110 remotely using the remote device 190.

Based on the above, a person skilled in the art will appreciate that the user might be authenticated either at the system 110 itself with the help of the sensors or at the ECD 160 with the help of the biometric sensor 166. In one example, the administrator may include conditions or context that the ECD 160 be in proximity to the system 110 at time of authenticating the user. In order to ensure that the ECD 160 is in proximity to the system 110, the system 110 might be configured in a way that the system 110 has to determine that the ECD 160 is communicatively connected to the system 110 via the short-range network protocols such as Bluetooth, RFID at the time of persistently authenticating the user. Additional context-sensitive restrictions might be configured to ensure that hackers or unauthorized users do not get access to information stored in the system 110. After the authentication with the help of the ECD 160, the user might be allowed to perform allowed operations on allowed resources at the system 110 while satisfying the appropriate context-sensitive restrictions.

In accordance with the present invention, when an authorized user wishes to perform a certain allowed operation, at first, the user may use one of the authentication methods e.g., fingerprint sensor to authenticate him/her to allow the desired operation to be initiated. For example, consider that the authorized user wants to read a message received on system 110. The authorized user may be prompted by the system 110 to authenticate him/her using the biometric authentication mechanisms e.g., fingerprint or facial recognition to ensure that the authorized user is authorized to read messages from the sender and he/she is the intended receiver of the message. After receiving the fingerprint details, the processor 112 may verify the fingerprint details with that of stored fingerprint details. If the fingerprint details match, then the system 110 may allow the authorized user to access the authorized operation that he can perform on the system 110 given that context-sensitive restrictions are satisfied. Once the user has been authenticated and while the user is persistently authenticated by the biometric authentication mechanisms e.g., fingerprint authentication, the allowed operation i.e., display message is validated as being authorized to the user in the given device and any possible context. If the operation is allowed, which resource is the operation is requesting to be acted upon, for example a message (from whom, recently, etc.) is checked. If allowed, the message is displayed.

In the above example, if the fingerprint of the authorized user does not match with the stored fingerprint details indicating that user is an unauthorized user, then the processor 112 halts the allowed/authorized operation from being performed, and initiates a resolution process. For example, the processor 112 may display information that is a cypher of the original information, or that the information is no longer available to be displayed. It is preferable to display the cypher of the original information i.e., message. However, any other mechanism may also be used to protect the information from being displayed to the unauthorized user. For example, the window where the data is being displayed can be made black, or an image is displayed on top i.e., superimposed on the message/information, or a fake message is displayed, or a message that warns that the operation/display of message is not authorized, etc.

In the above example, if the system 110 tries to authenticate a user using the ECD 160, then the authorized user may use the biometric sensor 166 so that the ECD 160 authenticates him/her. Optionally, the authorized user may use additional sensors provided in the ECD 160 to establish contextual information about the location, time, weather, and other conditions that can be used as trigger mechanisms for an authentication scheme. When the authorized user tries to authenticate, the authentication module 168 in the ECD 160 may determine authentication of the authorized user. The authentication module 168 may check the biometric information sensed by the biometric sensor 166 and compare the biometric information and contextual information of the authorized user stored in the second memory 164 to determine whether they match. If the biometric information matches, then the transceiver 170 may transmit the authentication determination made by the authentication module 168 to the processor 112. After receiving, the processor 112 may verify the fingerprint details with that of stored fingerprint details in the main memory 115. If the fingerprint details match, then the processor 112 may allow the authorized user to perform the allowed operation on the allowed resource under the allowed context. As such, the processor 112 may retrieve the allowed operation and display the message on the ECD 160. If the authorized user's fingerprint does not match with the stored fingerprint details of the authorized user either by the authentication module 168 or by the processor 112, the processor 112 halts the allowed/authorized operation from being performed, and initiates the resolution process, as explained above.

Based on the above, a person skilled will appreciate that when the authorized user is authenticated, the authorized user is allowed to perform the allowed operations on the allowed resources while satisfying the context-sensitive restrictions. Further, when the authentication fails, the authorization to perform the operations is revoked and countermeasures are performed to guarantee confidentiality and integrity of the information.

As specified above, the user is authenticated before allowing him/her to perform the allowed operations on a resource or/and a multitude of resources. Examples of the authorized operations may include, but not limited to, turn ON/OFF the device, use/run/close an application, open/edit/copy/save/delete a document, send/read a message/document/file/image/voice message, make/answer a phone/video call, read/modify an application or operating system setting, take/erase pictures/videos, stream sound/video, etc.).

Figure 4:
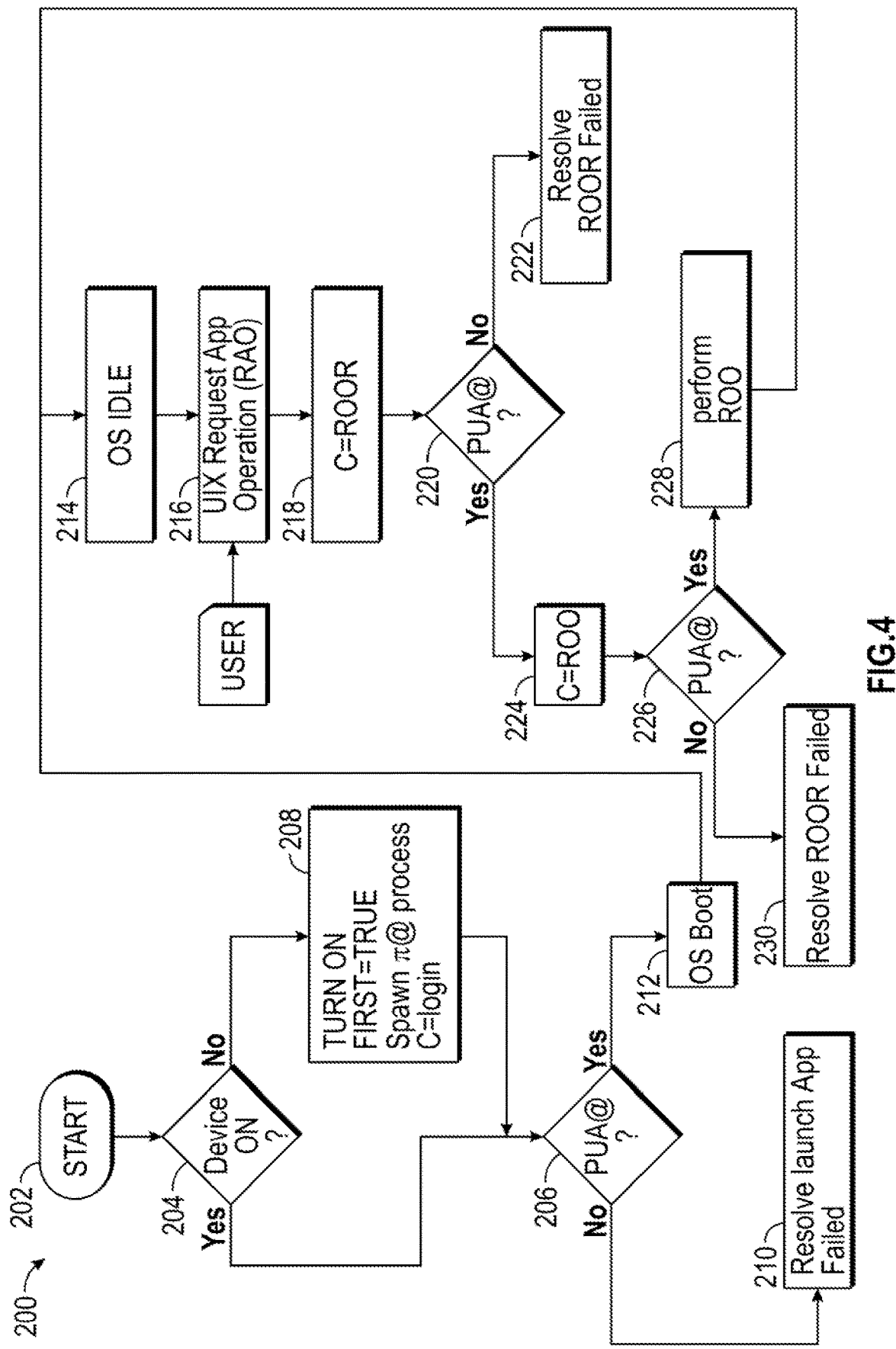
FIG. 4 illustrates a method 200 of authenticating and allowing a user (authorized user) to perform allowed operations when the system 110 is turned ON, in accordance with one embodiment of the invention.

Now referring to FIG. 4, a method 200 of authenticating and allowing a user (authorized user) to perform the allowed operations when the system 110 is turned ON is explained, in accordance with one exemplary embodiment of the present invention. The order in which the method 200 is described should not be construed as a limitation, and any number of the described method blocks can be combined in any order to implement the method 200 or alternate methods. Additionally, individual blocks may be deleted from the method 200 without departing from the spirit and scope of the subject matter described herein. Furthermore, the method 200 can be implemented in any suitable hardware, software, firmware, or combination thereof. However, for ease of explanation, in the embodiments described below, the method 200 might be implemented using the above-described system 110.

The method 200 starts at step 202. At step 204, it is determined whether the system 110 is turned ON. It should be understood that first time, an Authentication Daemon is spawned to run in the background. This daemon will check for the Persistent User Authentication (PUA) for each of the operations subsequently. If the system 110 is turned ON, then the method 200 moves to step 208, where Persistent User Authentication (PUA) is spawned as a memory-resident program. It should be understood that PUA indicates the persistent presence of the user in authenticating, accessing and performing the allowed operations on the selected resource, under the allowed context on the system 110 to ensure that the authorized user is performing the authorized operations. At step 206, if a possible global variable, "PUA@" is not present, then it is considered that launching of application has failed and a resolution process is initiated corresponding to the particulars of the persistent user authentication, i.e., (user, operation, resources, context), as shown at step 210.

If the system 110 is not turned ON i.e., the system 110 is OFF at step 204, then the method 200 moves to step 208. At step 208, the system 110 is turned ON for the first time and the persistent authentication is spawned as a memory-resident program (step 208). Once the authorized user is authenticated at step 208, then an Operating System (OS) of the system 110 is turned ON or booted to proceed to the startup processes and spawn any "memory-resident" processes that will run in the background (step 212) and go into an "Idle" mode (step 214), where the system 110 will wait for the authorized user to interact with the system 110. For example, the system 110 may wait for the authorized user to launch an application, scroll the view, press a button to change the volume, shake the smartphone, etc. It should be understood that any action that changes the current context (including inaction—where time passes) also changes the current context.

During the OS Boot 212, the OS may hide/display or provide/negate access to certain applications or features that the authorized user may not be allowed to access/operate. For example, the current authorized user to operate the device, may not be allowed to operate or run certain applications (e.g., messaging app, web browser, etc.) on the device (e.g. smartphone, tablet), in the current context (e.g. outside a secure building, outside office hours, weekend, etc.). In such a case, icons of the disallowed applications will not be visible and/or accessible to the user. Or they might be visible, but when trying to access them, in 216, they will not work, or a message explaining that the user is not allowed to perform such an operation under the current context appears. Which action is to be performed depends on the resolution process, 222 or 228, built-in to the system.

When the authorized user requests an action i.e., Request App Operation (RAO) from the OS at step 216, the context changes to that specific request. When that occurs, the π@ Daemon (π@ indicates persistent authentication) will validate that the authorized user (step 218) is authorized to perform the requested OS action i.e., PUA@, at step 220. As explained above, if the authorized user is not an authorized user, then, a specific resolution process is delegated, as shown at step 222. If the authorized user is authorized, the new context is to perform the Requested Operation (ROO), as shown at step 224. While performing the ROO, the context may change and the π@ Daemon continuously validates the {user, operation, resources, and context} (at step 226) and again, if not allowed, the appropriate resolution is executed (step 230). If the authorized user is authorized even after change in context, the requested operation (ROO) is performed (step 228), after which, the OS returns to Idle (step 214). At step 228, the requested operation may change the "state" of the system 110, and create a hierarchy of requests as the state of the system 110 or context changes. Eventually, the hierarchy is resolved when the user quits the Application.

Figure 5:
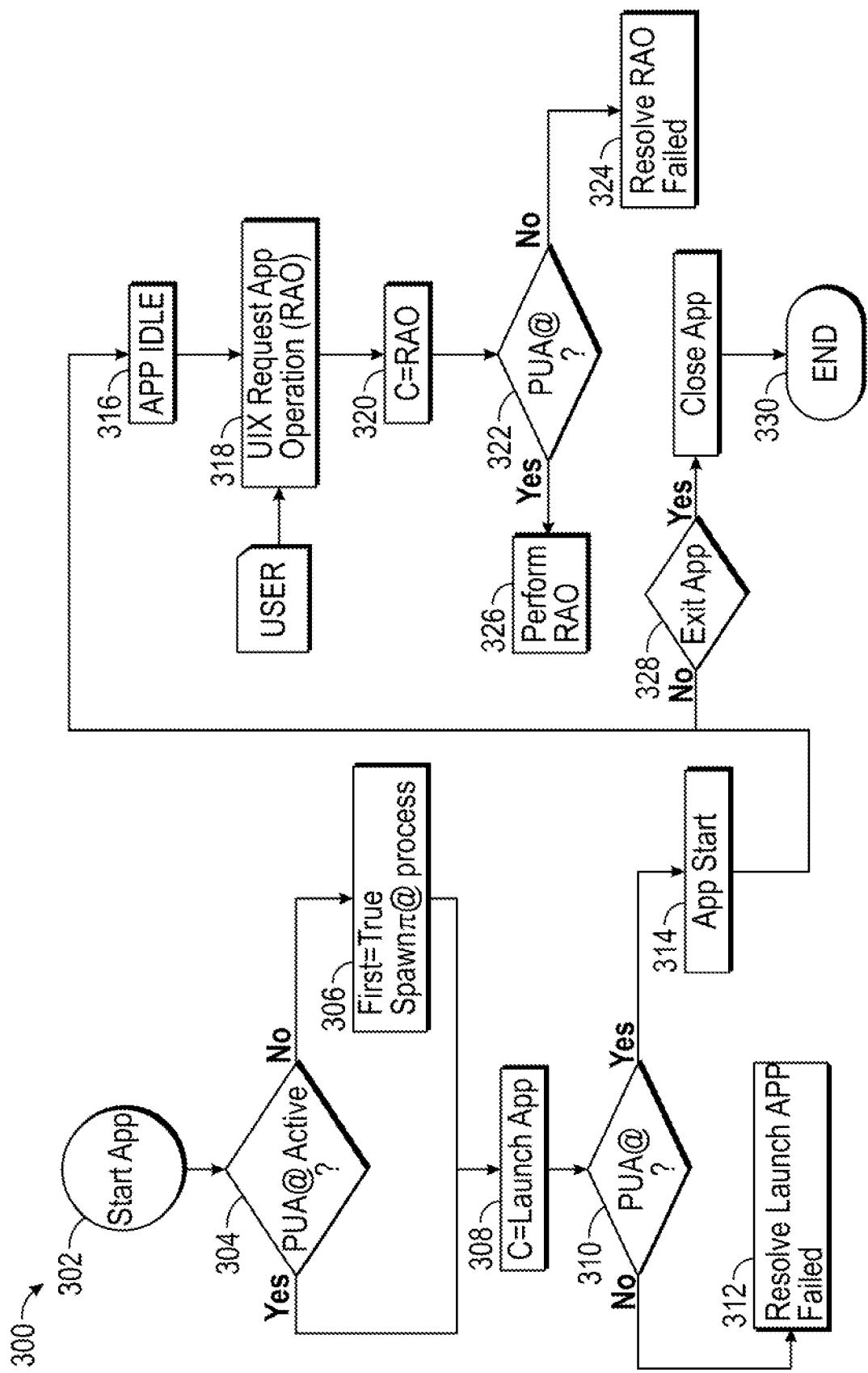
FIG. 5 illustrates a method 300 of Persistent Authentication when launching an Application, in accordance with one embodiment of present invention.

Now referring to FIG. 5, a method or process 300 performed when the OS operation request is to launch an Application is explained, in accordance with one exemplary embodiment of the present invention. In other words, the FIG. 5 shows a procedure of Persistent Authentication when launching an Application. At step 302, the application is launched. Further, the system 110 checks if the PUA@ is "Active", i.e., the π@ Daemon is running. If the π@ Daemon is not running, then the variable FIRST is set to TRUE to let the π@ Daemon that it is the first instance and the Daemon is spawned, as shown at step 306. If at step 304, it is determined that the π@ Daemon is running, the current context is set to launch the App, as shown at step 308. If the authorized user is allowed to launch the App, then the App starts (step 314), and if not, the corresponding resolution process is executed (step 312). After the application startup sequence is executed at step 314, most apps go to an "Idle" mode (step 316) where the system 110 waits for the authorized user to interact with it. For example, a messaging app may wait for the authorized user to select a chat, or type in the keyboard a message, or click the send button, etc. As explained above, any action by the authorized user may change the current context (including inaction—where time passes). As such, when the user interface (UIX) detects a user Request App Operation (RAO), step 318, the context is changed to this requested action (step 320). At step 322, the π@ Daemon validates whether the RAO is authorized. When it is determined that the π@ Daemon is not authorized for the {user, operation, resources, context}, the corresponding RAO resolution process is executed (step 324). If the RAO is authorized at step 322, the RAO is executed, as shown at step 326, after which, the App checks whether the RAO is to exit the App (step 328). If the RAO is to exit the App, the termination process is executed which saves any work, closes opened ports, etc. and removes the App from memory (step 330). If the RAO is not termination (to terminate the App), the App returns to Idle mode (step 316). It should be understood that as the app returns to the idle state/mode of send/receive, the state and context for the App and system 110 might have changed and thus the system 110 waits for the authorized user to interact with it with the changed state and context. The state of the system 110 might be captured using one of current context, current biometrics, taking a picture, starting video recording, starting audio recording, recording date-time stamp, recording geolocation, recording near networks and combination thereof.

Figure 6:
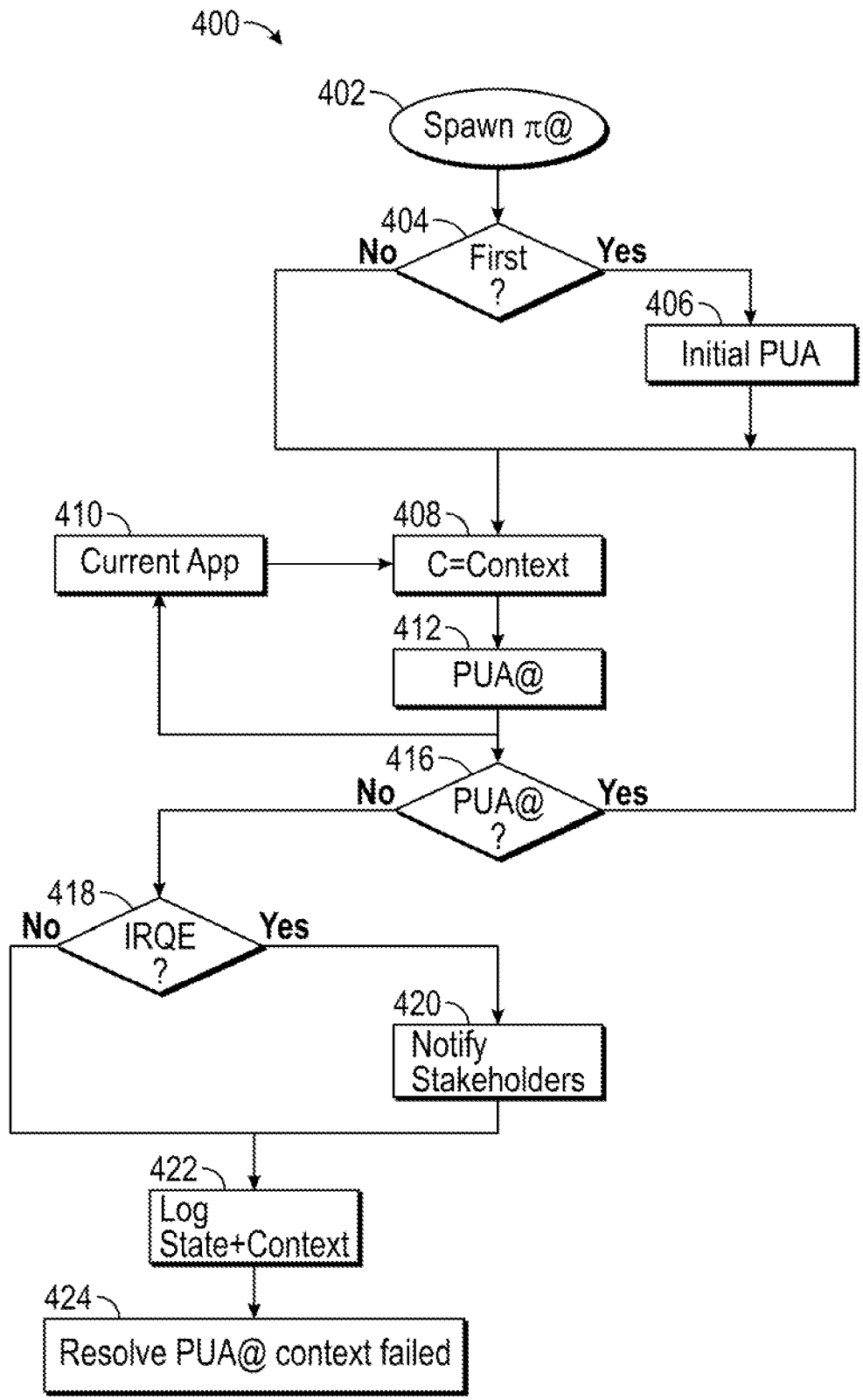
FIG. 6 illustrates a method or Authentication Daemon process 400 from initiation, in accordance with one embodiment of present invention.

Now referring to FIG. 6, a method 400 of spawning sequence and continuous process of the π@ Daemon (Authentication Daemon process from initiation, explained in FIG. 8 and FIG. 9) is explained, in accordance with one exemplary embodiment of the present invention. It should be understood that method 400 begins when the π@ Daemon is spawned (step 208 in method 200 or step 306 in method 300). As such, when the π@ Daemon is spawned (step 402) by the OS (as at step 208) or Application (as at step 306), the system 110 checks whether this is the first time it is executed, at step 404. If it is the first time, then the internal states of the π@ Daemon are initialized, as shown at step 406. In particular, the first Persistent User Authentication (PUA) is performed. After the first authentication (step 406) or when it is not the first time the π@ Daemon is spawned (step 404), i.e., when the π@ Daemon is running, the context is set from the OS or App (step 408). As such, the context is updated for the Current App (step 410), which includes the OS itself. It should be understood that the context is set from an external App (step 406) and the PUA and authorization is evaluated (step 412) resulting in the global (or local depending on the scope) variable PUA@. When multiple threads are run by the processor(s) 112 of the system 110, the current process or App are represented in the "Current App" block 410.

Subsequently, the π@ Daemon checks if the {user, operation, resources, context} is authenticated and authorized/allowed (step 416). At step 416, if the authorized user is authenticated, authorized and allowed (AAA), then the step 416 goes back to step 408, i.e., to continue daemon. At step 416, if it is not AAA, then the daemon exists in the loop. It should be understood that the PUA, operation authorization, and allowable resources and context (AAA) (as shown at step 412) is continuously evaluated. The information about the PUA@ is given back to the Current App where the requested operation is performed-when the corresponding PUA@ is TRUE. The administrator or the authorized user may configure the system 110 how often the step 412 needs to be performed at the beginning of the spawning process (step 406). In other words, an Application developer, or the administrator or manager, or the authorized user himself, if allowed, may determine how step 412 needs to be performed along with parameters. If the PUA@ is FALSE at step 416, then the π@ Daemon checks if the variable (set up in step 406) i.e., an Interrupt Request Enabled (IRQE) is TRUE (step 418). If the IRQE is TRUE, then a notification process (step 420) is executed that might be overridden for the particular AAA violation and the {user, operation, resources, context} state. For example, a pop-up message might be shown for the violation, and the manager/administrator (or any preselected stakeholder(s)) might be alerted of the violation. After notification (at step 420), if enabled, a log is created if it doesn't exist or this particular violation is appended to it (step 422). At step 420, if it is not enabled, then the method 400 goes back to step 418. In the log, the state of the system, {user, operation, resources, context}, including geolocation, date and time, current App, etc. are stored. Subsequently, the particular resolution process is then performed (step 424), which is explained in detail with the help of FIG. 7. Then, the π@ Daemon goes back to step 408, where the next context is modified and the PUA@ is resolved as shown at step 412.

Figure 7:
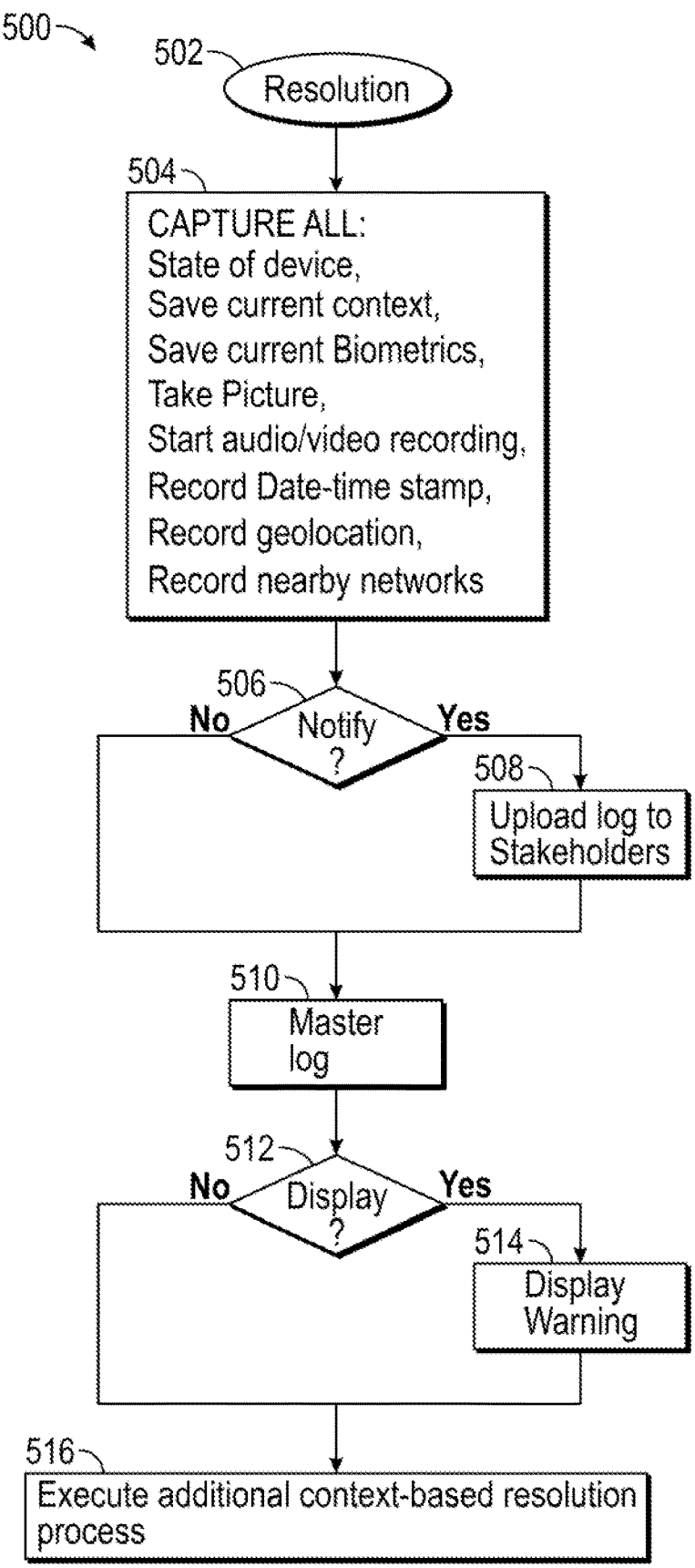
FIG. 7 illustrates a process 500 of resolution, in accordance with one embodiment of present invention.

Now referring to FIG. 7, a process 500 of resolution is explained, in accordance with one exemplary embodiment of the present invention. It should be understood that the system 110 may have all the information associated with the system 110, the ECD 160, the remote device 190, sequence of steps that needs to be performed for authentication and allowing the authorized user to perform allowed operations on the allowed resources based on the allowed context. For example, the system 110 stores all the resolution processes for all states of the system 110 i.e., the system 110 stores all the resolution processed for the system: user, operation, resources, and contexts, biometrics information from all the resources, geolocation, date, time, current App, etc. As such, when the resolution process (500) begins (as shown at step 502), the system 110 may capture all the information such as taking a picture, starting a video and/or sound recording, depending on the type of violation, breach and the settings of the π@ Daemon (step 406 from FIG. 6). In addition to the standard sensors (including the ones being used for persistent authentication) that are available to the system 110, and depending on the resolution settings, the resolution process 500 may initiate additional data collection processes such as start audio and/or video recording such that the violator may be identified later by the administrator or law enforcement. Further, geolocation and neighboring networks can be recorded and streamed to stakeholders, administrators, and law enforcement to aid in the retrieval of the device(s) and possibly to be used as criminal evidence for prosecution.

It should be understood that the system 110 might store the information locally in the main memory 114 and/or remotely at the server 180. Further, the system 110 may display where the information is stored (step 514). When the resolution process is initiated and after the data is collected, it is checked whether a notification flag is enabled (step 506). If the notification flag is enabled, then the information collected is sent to the stakeholders such as administrator or users in hierarchy level (step 508). For example, the manager might be notified with a request for his/her action, the authorities are notified. Additionally, as part of the resolution process, different actions might be programmed such as the App/OS may be frozen, a pop-up message may appear, the user is sent to a sandbox to record the mechanism/steps/methods he/she uses, obfuscation commences, etc. It is preferred to provide the resolution, which includes obfuscation. As specified above, the information might be obfuscated; either by converting the data into a cypher or information might be blackened so that the information cannot be viewed. In this way the user reading a message is no longer authenticated, and the message displayed is the cypher of the message. That way, any onlooker or unauthorized user will not be able to see the private/confidential information.

If notification is not enabled (at step 506) or after notification (step 508), all the information collected is uploaded to a Master Log Server or server 180 (step 510) for lateral retrieval. Subsequently, the system 110 may check whether a display flag is enabled (step 512). If the display flag is enabled, then a warning might be displayed (step 514) at system 110. If the display flag is not enabled (step 512) or after displaying the warning (step 514), any additional resolution process specific for the particular violation is executed (step 516).

It should be understood that the persistent user authentication (PUA) might be performed as spawned processes for different resources, sensors, and contexts. In a generalized device, the authorized user may request different services and run a variety of applications that may use similar device resources. The applications themselves may have nested contexts and might be recursively embedded while configuring the system 110 or the accessibility protocol.

Figure 8:
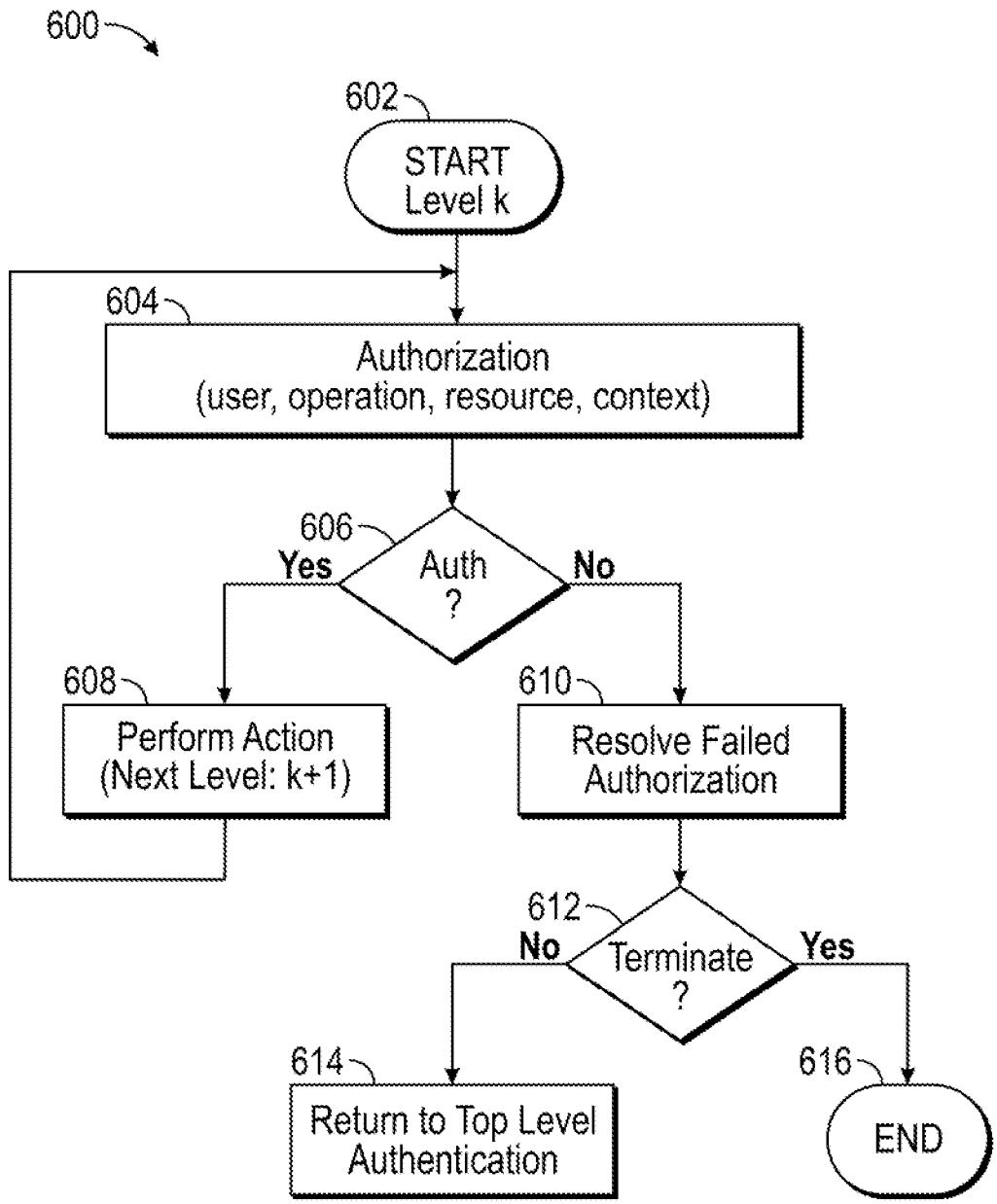
FIG. 8 illustrates a process 600 showing generic level of recursion authentication program flow is performed, in accordance with one embodiment of present invention.

Now referring to FIG. 8, a process 600 how a generic level of recursion authentication program flow is performed is explained, in accordance with one exemplary embodiment of the present invention. In order to explain the generic level of recursion authentication program flow, several assumptions are made in the current example. For example, it is assumed that the level is k and k+1 is assumed as the next higher level in the hierarchy. Now, assuming that the authorized user is at a given level k (step 602), the authentication of a given entry (step 604) in the rules dictionary may comprise entries like {device/system, user, operation, resources, context}. For example, consider that an authorized user is trying to turn ON the system 110 outside the office, or an authorized user tries to run a messaging app at midnight, or the authorized user wants to read a message from a chat group while not at his office, or the authorized user wants to delete a chat group that she is not the owner, etc. The result of the authorization validation returns whether or not the entry is authorized or not is checked (step 606). If the entry is authorized at step 606, then the action is performed (step 608) and the system checks for the next entry i.e., next level k+1 (step 602). If the request is not authorized at step 606, then a resolution process is initiated (step 410), after which, the test for termination (step 612) determines if the system exits/ends (step 616) or the system 110 returns to the previous level in the hierarchy (step 614).

Figure 9:
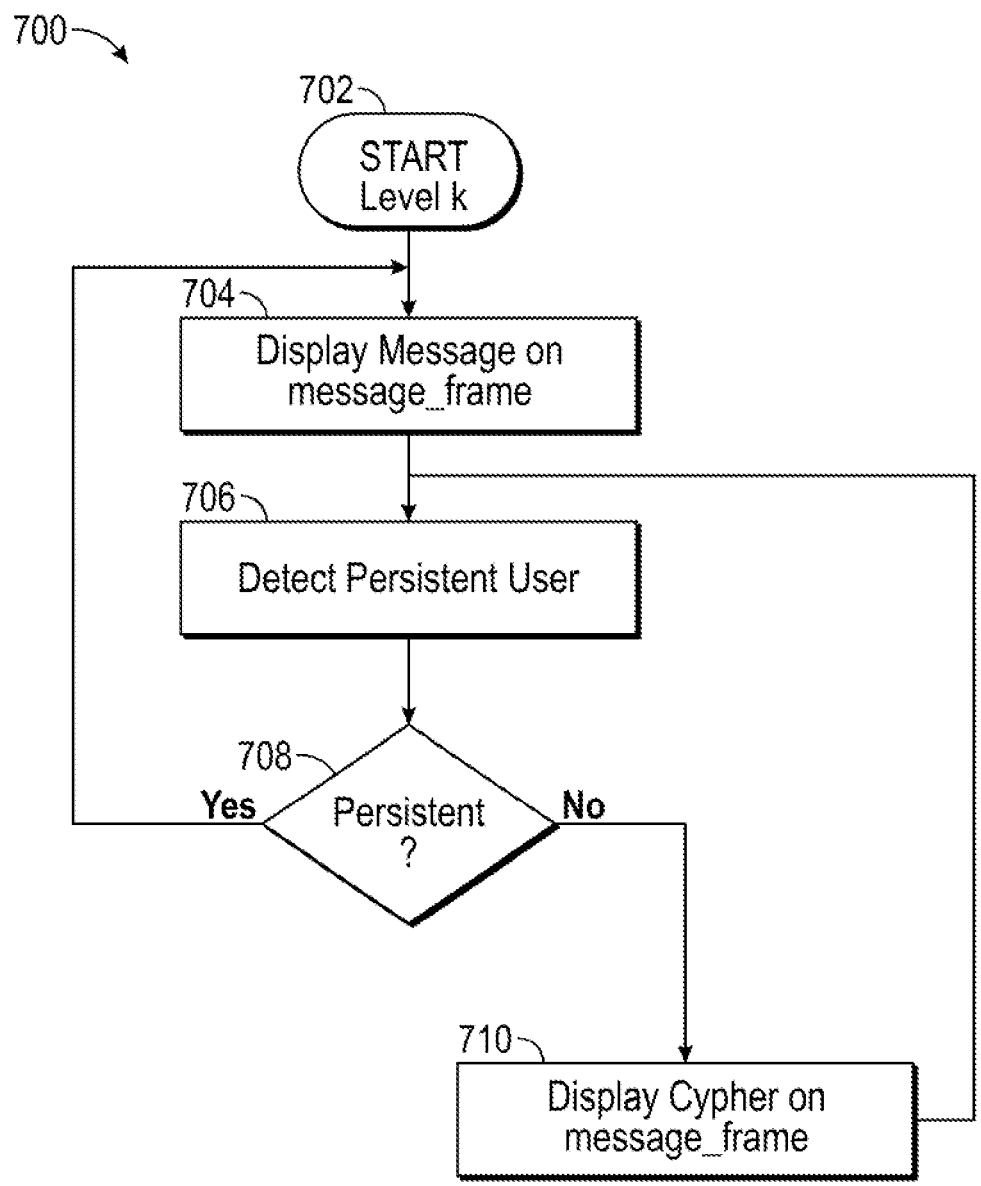
FIG. 9 illustrates a process 700 in which a context where the authorized user tries to view a message on a message frame, in accordance with one exemplary embodiment of present invention.
Figure 10:
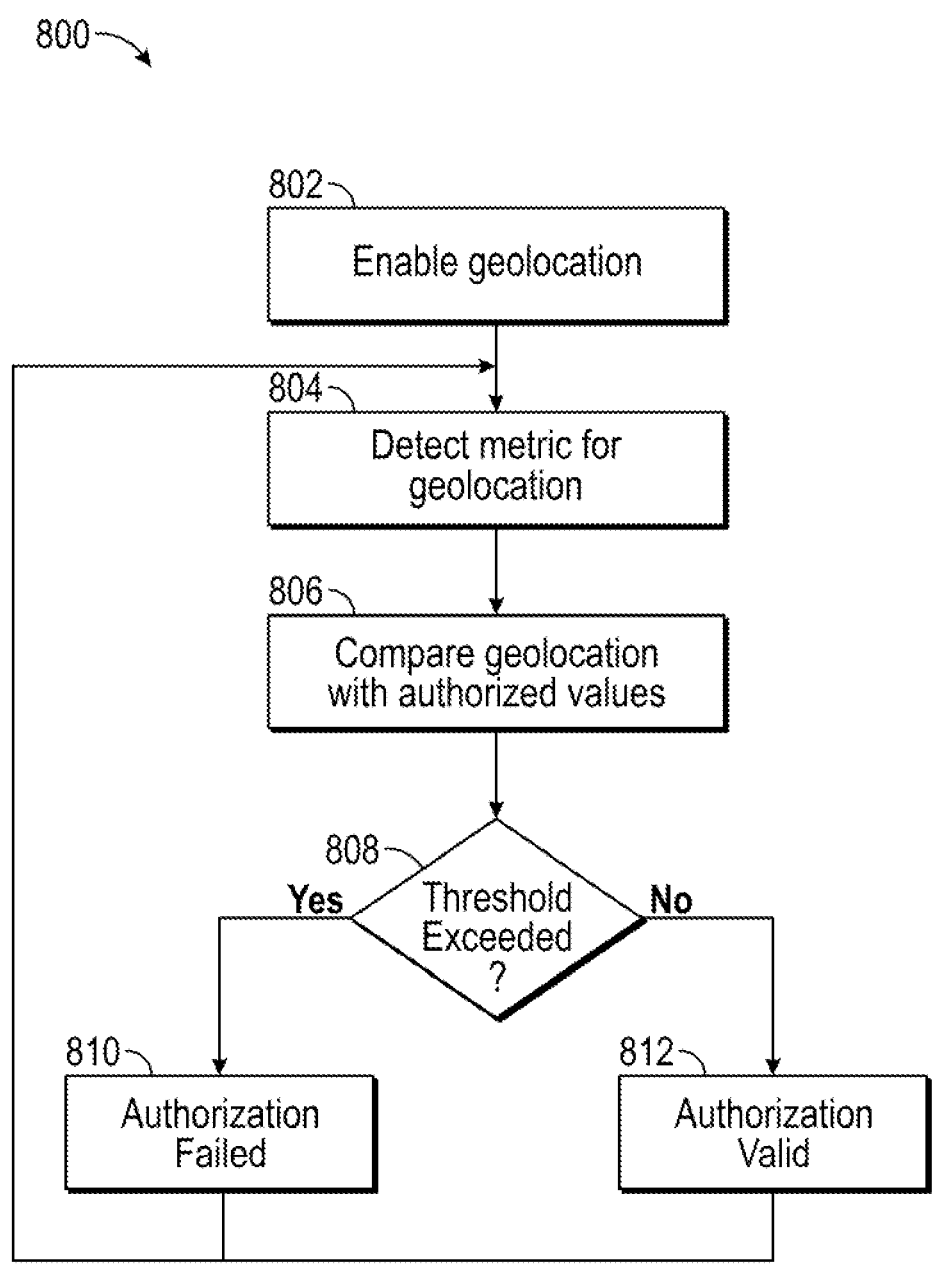
FIG. 10 illustrates an exemplary process 800 of authentication when the context of an operation is restricted to certain geolocation, in accordance with one exemplary embodiment of present invention.
Figure 11:
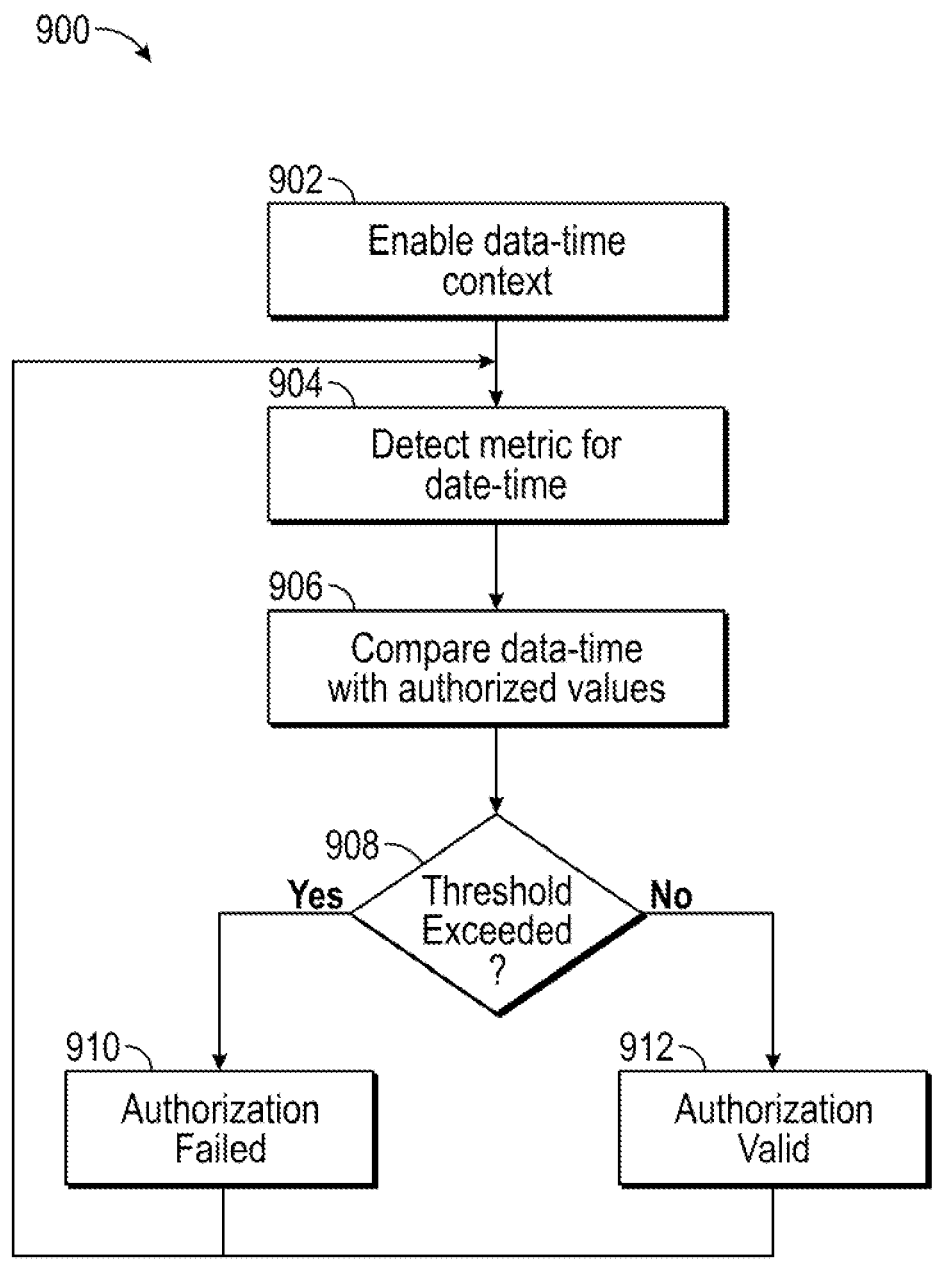
FIG. 11 illustrates an exemplary process 900 of authentication when the context of an operation is restricted to a certain range of dates and times, in accordance with one exemplary embodiment of present invention.

Now referring to FIGS. 9 to 11, specific examples of the process 600 explained in FIG. 8 are explained. Referring to FIG. 9, a process 700 in which a context where the authorized user tries to view a message on a message frame is explained, in accordance with one exemplary embodiment of the present invention. Assuming that the authorized user is at a given level k (step 702), the authorized user may be authorized, and may try to display the message (step 704) in the app's message frame. It should be understood that the system 110 might have been configured to allow the authenticated user to view the same. Accordingly, after the user tries to display/view the message, the message is displayed, the PUA is called (step 706) to check if the authorized user is still there (step 708). When it is determined that an authorized user is present, then the message might continue to be displayed in the app's message frame as shown at step 704. If the authorized user is not present or no longer exists (step 710), then the resolution process might display a cypher of the message in the message frame as a source of obfuscation. The above process is performed for convenience, where the authorized user may have been distracted and looks away for a few seconds. It is anticipated that a considerable percentage of PUA@ violations are the result of the authorized user being distracted, i.e., looking away (when the Face ID/facial recognition is being used for authentication) or removing the finder from the sensor (when Finger ID is used for authentication). Hence a temporary halt of the process, obfuscating the display 120 of the system 110 is recommended. It should be understood that the resolution process shown here is provided for illustrative purposes and should not be construed in a limited sense. The system 110 might be configured to provide other resolution processes that were discussed above or any other resolution processes within the scope of the resolution process disclosed hereinabove. For example, when more than one face is detected as being actively looking at the display 120, a visual cue (e.g., red lock) may appear on the display 120 as it is obfuscated. The authorized user may override this restriction by clicking in the cue.

Now referring to FIG. 10, a process 800 illustrating an example of authentication when the context of an operation is restricted to certain geolocation, in accordance with one exemplary embodiment of the present invention. At first step 802, geolocation of the system 110 might be restricted. It should be understood that the system 110 might obtain the geolocation (step 804) using the GPS sensor 150 and compare the geolocation of the system 110 with the set of authorized values (step 806). In one example, the accuracy or proximity in the geolocation might be determined based on a threshold of closeness between the authorized values and the geolocation of the obtained from the GPS sensor 150 (step 808). If the location of the system 110 is close to the authorized values, then operation is authorized for execution (step 812). If the threshold is exceeded, then the location constraint is violated, and the authorization fails (step 810), where a resolution process is initiated.

Now referring to FIG. 11, a process 900 illustrating an example of authentication when the context of an operation is restricted to a certain range of dates and times, in accordance with one exemplary embodiment of the present invention. At step 902, date and time context is enabled in the system 110. It should be understood that the system 110 might obtain the required sensory input and their processing to detect the variables that will be used to validate the requested authentication. Accordingly, the system 110 may obtain the date and time (step 904) from the sensors and compare it with a set of authorized values (step 906). In one example, the accurate or proximity in the date and time might be determined based on a threshold of closeness between the authorized values and the date and time of the obtained from the sensors. As such, the authorization may depend on the closeness between the authorized values and the date and time of the obtained from the sensors (step 908). When the date and time are close to the constraints or authorized values, the operation might be authorized (step 912) and if the threshold is exceeded, then the date and time constraint are violated, and the authorization fails (step 910), where a resolution process is initiated. For example, consider a time-sensitive operation where a user is given 10 minutes to reply to a message or a student is provided with one hour to complete a test. After completion of the time, the time-sensitive operation is configured to terminate, and a failure message might be shown to the user.

Figure 12:
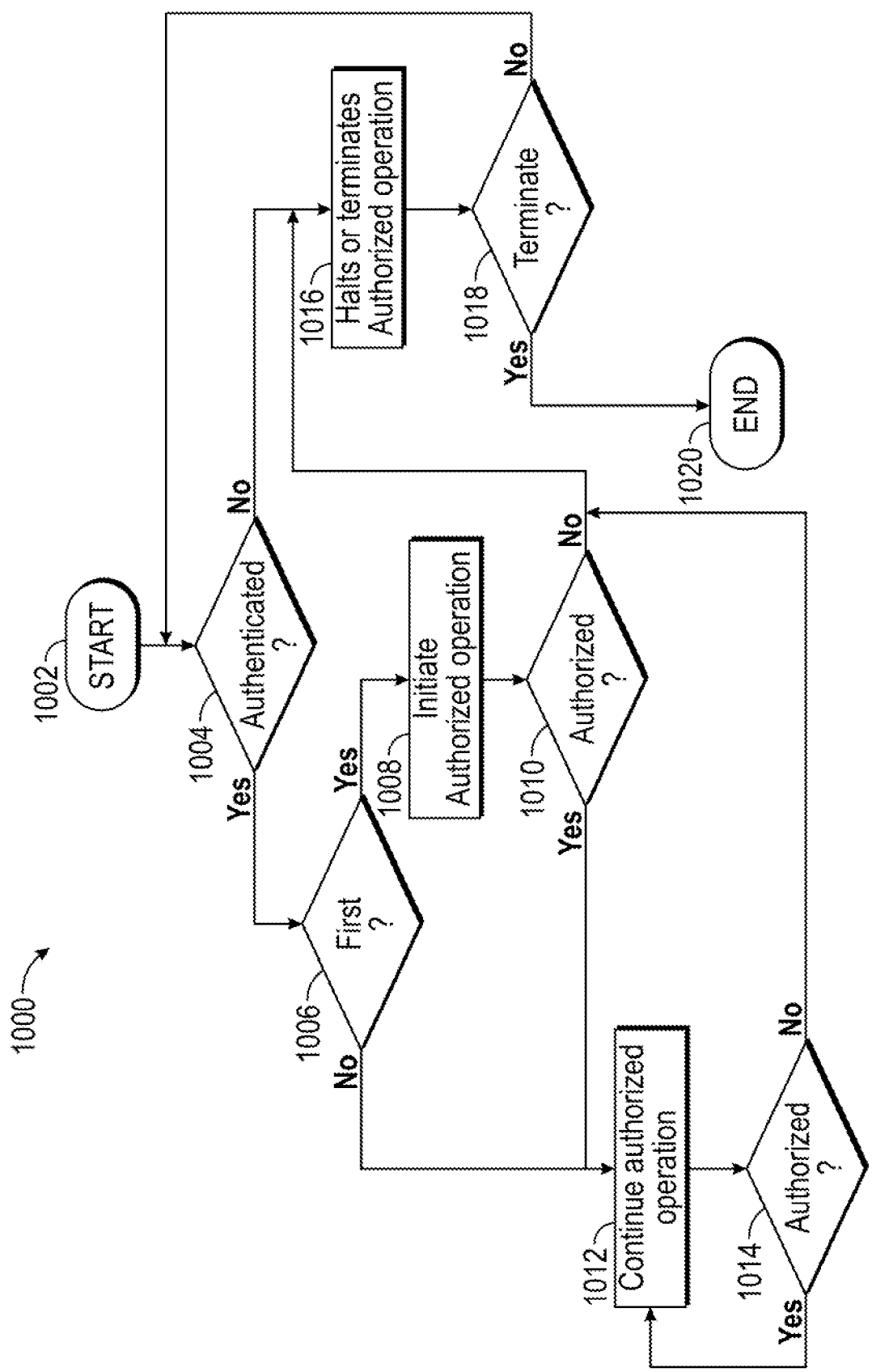
FIG. 12 illustrates a process 1000 of persistent user authentication for the first use, in accordance with one exemplary embodiment of present invention.
Figure 13:
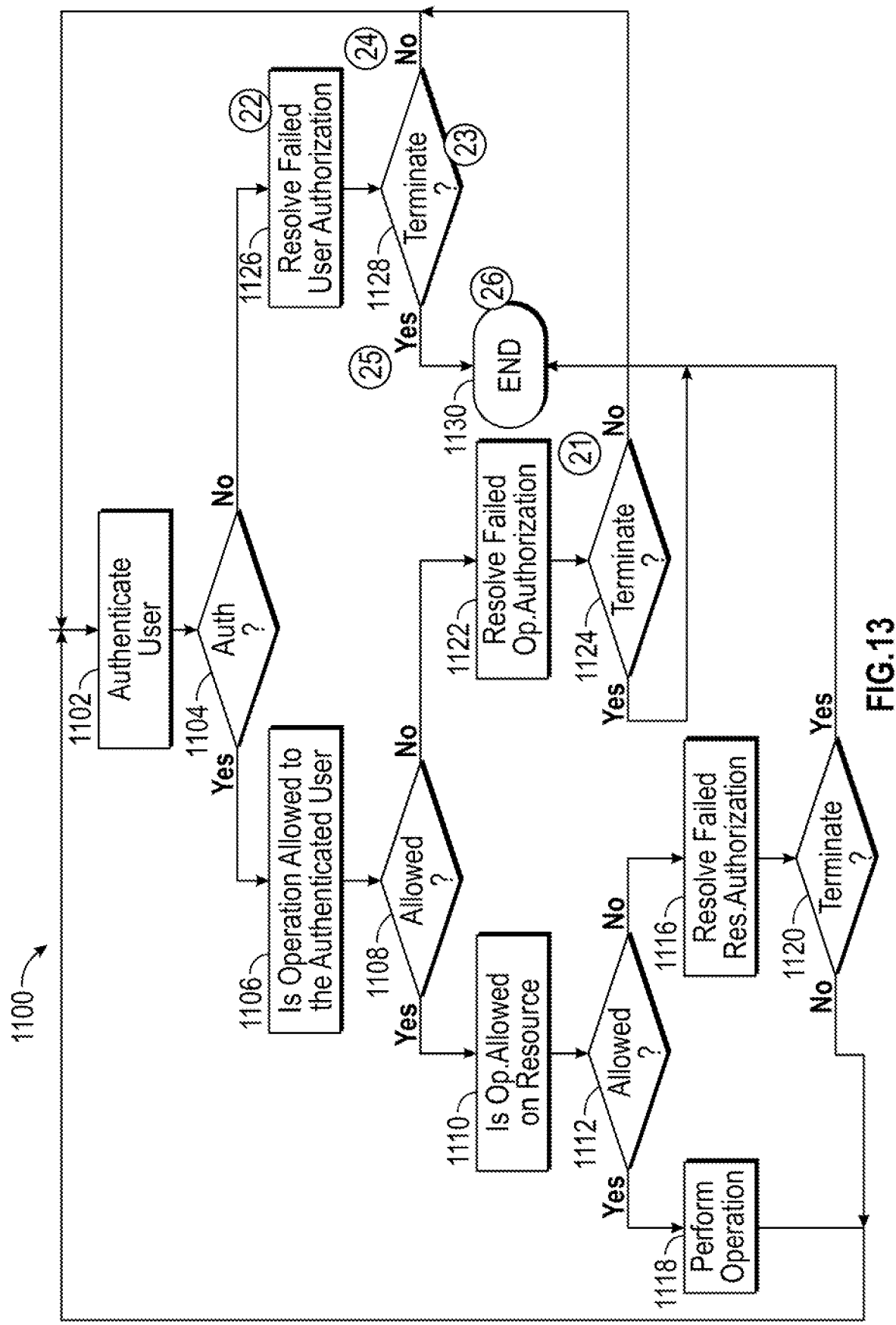
FIG. 13 illustrates a generic authentication hierarchical framework 1100 that is specific for a particular device, in accordance with one exemplary embodiment of present invention.

Now referring to FIGS. 12 and 13, hierarchical nature of the persistent authentication framework is explained. FIG. 12 shows a process 1000 illustrating persistent user authentication for the first use of the authentication, in accordance with one exemplary embodiment of the present invention. When the process for persistent user authentication begins (step 1102), the system 110 tries to authenticate the authorized user (step 1104). If it is determined that the authentication is activated for the first time (step 1006), then the system 110 initiates authorization operation (step 1108). In one example, when it is determined that the authorized user is undergoing authorization is tested, then different set of biometrics validation might be performed. For instance, a two-step authentication, such as password and facial recognition of the authorized user or token from the server 180 might be used for authorization. Subsequently, the system 110 tries to authenticate the authorized user (step 1010). If at step 1006, it is determined that it is not the first time for the authorized user, or at step 1010 it is determined that the user is an authorized user, then the system 110 proceeds to step 1012 to continue to allow the authorized user to perform authorized operations. If the authorized user is authorized (step 1014), then the step 1012 continues in loop. If the authorized user is not authorized to perform certain operations (at step 1010 and 1014), then the authorized operation is halted or terminated (step 1016). Subsequently, the authorized operation is terminated (steps 1018 and 1020). If the authorized operation is not terminated, then the system 110 goes back to the step 1102.

The process 1100 is further explained with an example. Consider that the user being authorized e.g. John Smith, the operation the user is attempting to perform is authorized, say, "view message" (allowed operation), and the operation in the given resource (data) is allowed, say, "view Mary Jones messages" (allowed resource), and this is happening in an authorized context (allowed context), say locale, date-time, etc., then the system 110 continues to allow the user to perform the allowed operation as long as the user is detected as engaged and the context is satisfied. If the Persistent Authentication fails, then the system 110 may halt or terminate the process 1100 may initiate a resolution process depending on the configuration made by the administrator.

FIG. 13 shows a generic process 1100 that is specific for a particular device, in accordance with one exemplary embodiment of the present invention. Specifically, FIG. 13 shows a generic authentication hierarchical framework. For each of the devices, the user is authenticated as authorized to access the device (step 1102). Next, based on the list of allowed operations for that user in the device, the user's intended operation is authorized (step 1106). Further, the object of the operation, referred to as resources is validated as to whether or not the user can perform such an operation on the selected resources (step 1110). As specified above, the authorized user is authenticated at every level of the hierarchy. As such, the user is authenticated (step 1104) at the first level of the hierarchy (step 1102). If the user is authorized at step 1104, then the next level in the hierarchy is to check whether or not the user is authorized to perform a given operation (step 1106). If the user is allowed to perform the operation at step 1109, then the next test is to validate that the user can perform the requested operation on a given resource (step 1110). If the authorized user is allowed, then the authorized user may perform the operation (step 1118). At each of the conditional branches i.e., at steps 1104, 1108 and 1112, when the authorization is false, a resolution process is executed, as shown at steps 1126, 1122, and 1116, respectively. Subsequently, the next operation may include termination (steps 1120, 1124, 1128 and 1130) or an obfuscation mechanism that waits for the right conditions to be satisfied. In one exemplary scenario, the operation may be terminated if it is determined that the authorized user looked away and his face is no longer recognized by the camera 142.

Based on the above, it is evident that when an authorized user wishes to perform a certain allowed operation, the user may use one of the authentication methods e.g., fingerprint sensor to authenticate him/her to allow the desired operation to be initiated. Concurrently or consequently, while the authorized user is being authenticated or verified, the system may retrieve the allowed operation that the authorized user may perform on the system. If the authorized user is authenticated, then the authorized user might be allowed to continue with the set of allowed operations assigned to the authorized user on the allowed resources while making sure that the context-sensitive restrictions are satisfied. When the authorized user is not authenticated, then the system may halt or terminate the operation, restrict or obfuscate the information from being accessed by the unauthorized user.

Further, the information, sensitivity of the information/confidentiality, biometric information, location, date and time may also be used as context to verify that the authorized operation is performed at a place, or/and that the authorized operation is being performed within an allowed date and time frame, etc.

Additionally, the ECD 160 may also be used for authentication of the authorized user without explicit intervention from the authorized user wearing the ECD 160. As specified above, examples of the ECD 160 may include a wearable device such as a smart match. In order to use the ECD 160 for authenticating the authorized user, the system 110 may determine automatically and continuously whether the authorized user is wearing the ECD 160. Further, the system 110 may obtain biometric information e.g., pulse rate data or electrocardiogram (ECG) data or Photoplethysmogram (PPG) data from the biometric sensor 166 and compare with the biometric information stored in the main memory 114. If the biometric information obtained matches with the stored biometric information, the system 110 may conclude that the authorized user is authenticated. If the authorized user takes off the ECD 160 interrupting or terminating sharing of the biometric information captured by the biometric sensor 166 with the system 110, then the system 110 may determine that the authorized user is no longer authenticated and halt or terminate the authorized operations.

As the authorized user is authenticated either using one-time authentication or a persistent authentication mechanism, the system and the information stored therein are protected from being accessed by the unauthorized users or hackers. Even if the hackers get pass the authentication process, if the unauthorized user tries to perform an operation that is not allowed for an authorized user (which the hacker might have stolen), then the system halts or terminates the authorized operations, and obfuscates the information such that the hackers will not be able to access the information thereby protecting the information.

Referring to FIG. 14, an environment 1200 of showing groupings of systems 1210/1290 similar to system 110, the first local network 175, and the External Companion Device (ECD) 160 of FIG. 1 is shown, in accordance with another implementation of the present invention. As in FIG. 1, the remote device 190 has been replaced with another system like 1210, labeled 1290, that comprises components local network 1275 and ECD 1295, equivalent to the components of system 1210. The system 1210/1290 is communicatively connected to the ECDs 1260/1295 via a first network 1275. The ECDs 1260/1295 might have a form factor of a wearable device such as a smart watch, or portable device such as a pager, pendant, or an attachable device. Such as a magnetically-attachable screen to the system 1210/1290. The ECDs 1260/1295 are paired with the respective system 1210/1290 to perform allowed operations as explained above. The FIG. 14 shows an embodiment of peer-to-peer communication using secure communication with persistent authentication "outside the box" (out of the main devices/system 1210/1290). The main devices (1210/1290) are used as portals to the global/second network 1285 and for local storage. The user will only interact with the ECDs 1260/1295. The ECDs will perform the PUA@. A server 1280 is used to manage the identification of the user's contacts and encryption key management for encrypted communication. The ECDs 1260/1295 are an enhanced version of the ECD 160 of FIG. 1, but less complex than the system 110 of FIG. 2 as it will be shown in FIG. 15.

In one embodiment of FIG. 14, and a separate disclosure of an invention, the ECDs 1260/1295 encrypt/decrypt all relevant data (sound, image, text, etc.) and are transmitted to the system 1210/1290 in encrypted form, both during transit and at rest (local storage at 1210/1290). So, if the main devices 1210/1290 (e.g., smart phone) is compromised (e.g., hacked), the information remains secured and only the user with the ECDs 1260/1295 and the persistent authentication will be able to access the information in its decrypted form.

Figure 15:
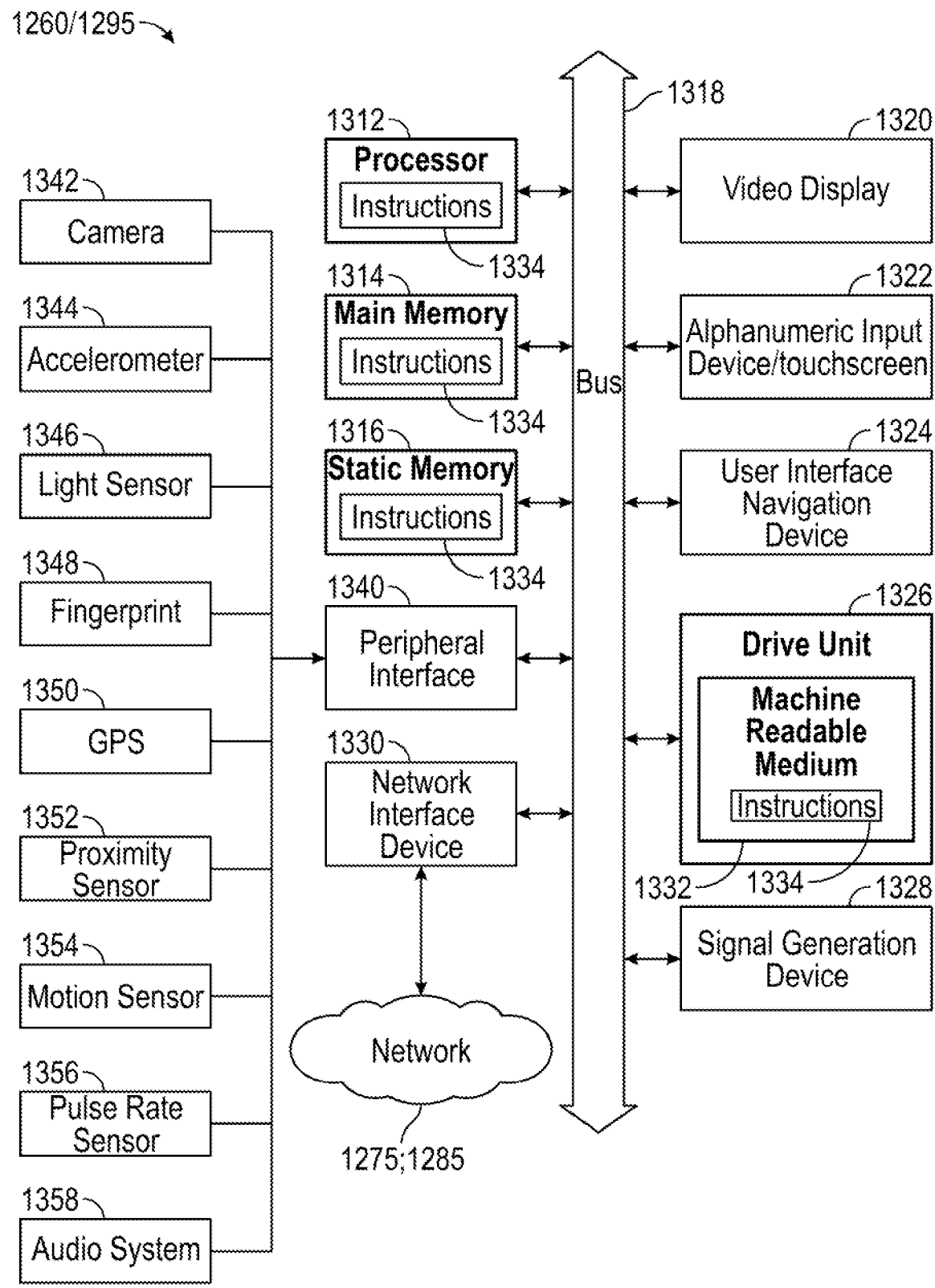
FIG. 15 illustrates a diagrammatic representation of an Enhanced External Companion Device (EECD) 1260/1295, in accordance with one embodiment of present invention.

Referring to FIG. 15, a diagrammatic representation of the ECDs 1260/1295 is shown, in accordance with one embodiment of present invention. Each of the ECDs 1260/1295 comprises a processor 1312 (e.g., a central processing unit (CPU), a graphics processing unit (GPU) or both, field programmable gate array (FPGA), field programmable analog array (FPAA), application specific integrated circuit (ASIC), programmable logic controller (PLC), mixed-signal circuitry, or a combination of any of them), a main memory 1314 and a static memory 1316, which communicate with at least one other via a bus 1318.

The processor 1312 may include any suitable processing device, such as a microprocessor, microcontroller, integrated circuit, logic device, or other suitable processing device.

The main memory 1314 may include one or more computer readable media, including, but not limited to, non-transitory computer-readable media, RAM, ROM, hard drives, flash drives, or other memory devices. The main memory 1314 may store information accessible by the processor 1312, including computer-readable instructions 1334 that can be executed by the processor 1312.

The instructions 1334 can be any set of instructions that when executed by the processor 1312, cause the processor 1312 to perform operations.

In one example, the main memory 1314 can be used to store data that can be retrieved, manipulated, created, or stored by the processor 1312. The data may include, for instance, organizational data, occupants' data, zone data, and other data.

The bus 1318 provides a mechanism for letting the various components and subsystems of the respective ECDs 1260/1295 to communicate with each other as intended. Although the bus 1318 is shown schematically as a single bus, alternative embodiments of the bus 1318 may utilize multiple buses. The bus 1318 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Each ECD 1260/1295 may further include a video display unit 1320 (e.g., a liquid crystal display (LCD) or a cathode ray tube (CRT)). Each ECD 1260/1295 further includes an alphanumeric input device (e.g., a keyboard) and/or a touchscreen 1322, a disk drive unit 1326, a signal generation device 1328 (e.g., a speaker), a network interface device or component (NIC) 1330, and a peripheral interface adapter (PIA) 1340.

The disk drive unit 1326 includes a machine-readable medium 1332 on which is stored one or more sets of instructions and data structures (e.g., software 1334) embodying or utilized by any one or more of the methodologies or functions described herein. It should be understood that the term "machine-readable medium" might be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine readable medium" may accordingly be taken to include, but not be limited to, solid-state memories, optical and magnetic media, and carrier wave signals.

The instructions 1334 may also reside, completely or at least partially, within the main memory 1314 and/or within the processor 1312 during execution thereof by the ECD 1260/1295, the main memory 1314 and the processor 1312 also constituting machine-readable media. The instructions 1334 may further be transmitted or received over the first network 1275 or the second network 1285 via the network interface device 1330 utilizing any one of a number of well-known transfer protocols or even a custom protocol.

The ECD 1260/1295 further comprises a plurality of peripheral devices or sensors connected to the peripheral interface 1340. The plurality of sensors may include a camera 1342, an accelerometer 1344, a fingerprint sensor 1348, a Global Positioning Satellite (GPS) Sensor 1350, a proximity sensor 1352, a motion sensor 1354, a pulse rate sensor 1356, and an audio system 1358. It should be understood that each of the camera 1342, the accelerometer 1344, the light sensor 1346, the fingerprint sensor 1348, the GPS Sensor 1350, the proximity sensor 1352, the motion sensor 1354, the pulse rate sensor 1356, and the audio system 1358 senses or captures respective data and sends them to the processor 1312 for processing and then to the main memory 1314 for storing the data.

The camera 1342 includes an optimal instrument capable of recording images or videos. The camera 1342 captures images or videos and transmits them to the main memory 1314 for lateral retrieval.

The accelerometer 1344 includes an electromechanical sensor capable of measuring acceleration forces acting on the ECD 1260/1295 and possibly velocities and orientation information of the ECD 1260/1295.

The light sensor 1346 includes a sensor for capturing ambient light falling or facing the ECD 1260/1295.

The fingerprint sensor 1348 includes an optical or pressure sensor capable of recognizing the fingerprint of a human being.

The Global Positioning Satellite (GPS) Sensor 1350 is used to determine the geolocation of the ECD 1260/1295 using satellites. Additionally, geolocation (especially inside buildings, where satellite pointing is limited or not available) can be approximated by the ECD 1260/1295 distances from nearby cell or radio antennae (like GSM-Global System for Mobile communications) towers or routers with known locations.

The proximity sensor 1352 includes a sensor capable of detecting presence of nearby objects without any physical contact. The proximity sensor 1352 may emit an electromagnetic field or a beam of electromagnetic radiation (infrared, for instance), and looks for changes in the field or return signal to detect presence of nearby objects. Similarly, other means (like acoustic/sonar for instance) may be used to estimate proximity information.

The motion sensor 1354 includes a sensor capable of detecting movement of the ECD 1260/1295. The pulse rate sensor or heart beat sensor 1356 includes a sensor configured to provide digital output of heartbeat when a finger of the user is placed on it. The audio system 1358 may include a microphone capable of recording the voice of a user of the ECD 1260/1295.

Although it is presented that the ECD 1260/1295 comprises the plurality of sensors such as the camera 1342, the accelerometer 1344, the light sensor 1346, the fingerprint sensor 1348, the GPS Sensor 1350, the proximity sensor 1352, the motion sensor 1354, the pulse rate sensor 1356, and the audio system 1358, the ECD 1260/1295 may further comprise additional sensors. The additional sensors may include sensors used for establishing contextual information about the location, time, weather, and other conditions of the ECD 1260/1295 and its environment that can be used as trigger mechanisms for an authentication scheme. Also, the peripheral devices mentioned above (1342-1358) could be passive or having themselves processing hardware and/or software (CPU, GPU, FPGA, etc.) and communication circuitry.

Figure 16:
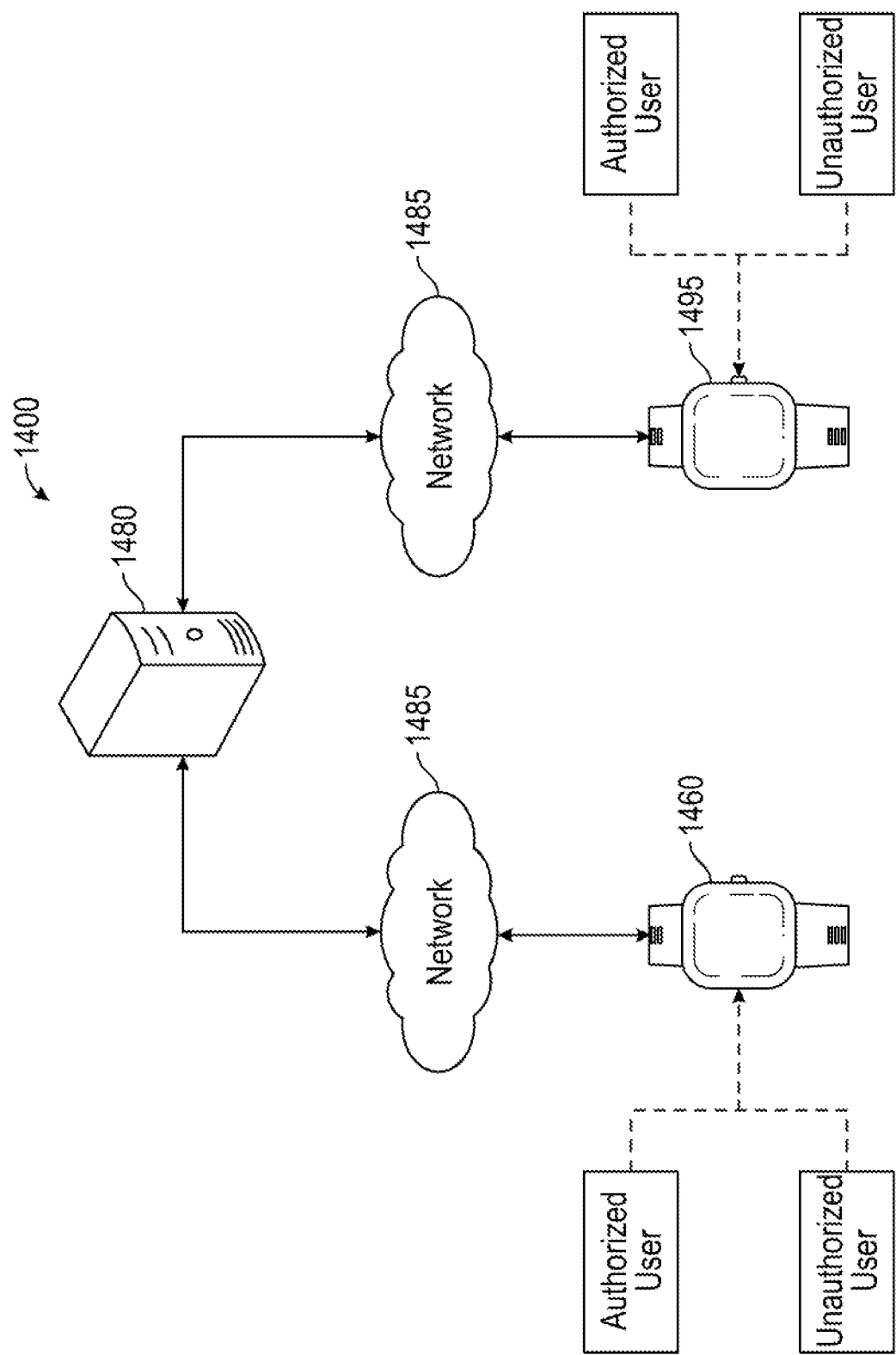
FIG. 16 illustrates an environment 1400 in which two external companion devices (ECDs) 1460/1490 can and are communicating via global network 1485. Each ECD 1460/1490 is capable of determining persistent presence of an authorized user while performing allowed operations on an allowed resource of the system while satisfying certain context-sensitive restrictions is implemented, in accordance with one embodiment of present invention.

Referring to FIG. 16, which is similar to FIG. 14, shows an environment 1400 where the main devices 1210/1280 are missing and furthermore ECDs 1460/1495 have Wi-Fi or Radio capabilities so they can connect directly to a Global network 1485. The new system (with only ECDs) is limited in performance compared to a system like FIG. 1 or FIG. 14. The system with only ECDs can still perform some basic communication functions like voice (over IP) calls, send/receive texts/messaging, video conferencing, taking and sharing pictures and storing them in a server 1480, sharing files/documents stored in the server 1480, etc.

Although the above disclosure is generally described in which the system for determining persistent presence of an authorized user while performing allowed operations on an allowed resource of the system while satisfying certain context-sensitive restrictions is implemented as a single system, it should be understood that the disclosed system might be scaled up such that multiple authorized users may try to perform allowed operations on an allowed resources of the several systems while satisfying certain context-sensitive restrictions. For example, where one or more of the authorized users try to access the system, the authorization context for these multiple authorized users may be one of a multitude of mechanisms to evaluate the identity and "likeness" of each authorized user with a digital fingerprint.

In summary, the present disclosure provides a system and method for allowing authorized users to perform certain associated authorized operations on allowable associated resources in electronic devices using resources, operations, and password and/or biometric persistent users' authentication. This system and method can be used both at the operating system level of an electronic device, in a particular application in such device, or on secondary devices associated with the device. The system and method provides the ability to authorize specific user through an electronic device or a multitude of heterogeneous devices with possibly different computational capabilities. The system and method further include a multitude of sensors distributed among the devices, an accessibility/authorization protocol that provides the rules for authentication and validation of devices/users/operations/resources/contexts, and firmware capable of authenticating a user or set of users with one or a multiple authentication elements.

The system and method perform different functions associated with the tuples of {device(s), user(s), operation(s), resource(s), context(s)}. These may include resolution processes when the authentication fails.

The authentication elements can be grouped together for multi-factor (primary, secondary, tertiary or more) simultaneous or near simultaneous authentication and/or authorization and can be a multi-step (initiation and persistent) authentication and/or authorization process, creating a sequence of methods according to a group of predefined settings that may depend on availability and status of devices, sensors and environmental conditions.

The authentication is done in a hierarchy of layers, starting with the user authentication and authorization to the device(s). Once the authorized user is authenticated, the operation the user intends to perform is also validated from a set of authorized operations associated with the user and the device(s). These may be allowed only under certain context(s), like geo-location, data-time, etc. Further, the specific operation has to be authorized for the user on an allowable resource(s) that is in a set of resources (data, information, messages, audio, images, files, media, etc.) where the user is authorized to perform such operations.

When authentication fails, given the {device(s), user(s), operation(s), data(s), and context(s)}, generic and specific predetermined resolution processes are executed. These might be hierarchical depending on the current state of the system (state of each device on the set of devices) or/and the current state in the application.

The system and method provide that authentication is performed in a remote device with authentication relayed via secure encrypted means. The authentication is performed in an external device. One or more of the external devices may be passive (like a beacon or RFID tag) that one or more of the devices can interact with it for authentication and/or context validation.

The system and method here disclosed provide that the authentication elements include, but are not limited to one or a combination of passcodes, facial or hand gestures, device gesture, signature, biometrics (voice, fingerprint, facial recognition, retinal scan, etc.). The authentication is performed in the device with data from the device sensors or data from sensors on other devices. Some of the authentication is performed in another of the devices.

The system and methods further provide that wherein the authentication elements are used, in accordance to predefined user preferences set by a manager or predefined by the app developer, to provide a user or group of user's authorizations. The system and methods include, but are not limited to:

(1) granting access to or deny access to using the computing device(s) (e.g., a phone, a tablet, a desktop computer, a router, a control panel, a Programmable Logic Controller, etc.).

(2) granting access to or deny access to perform an operation (e.g., launch an application, delete a file, print an image, edit a document, take a photograph, change volume, use microphone, access GPS, etc.)

(3) granting the ability or deny ability for executing specific action within an application (e.g., read a message)

(4) granting the ability or deny ability for performing a specific action within an application on allowed resources (e.g., read Mary Jones messages)

(5) granting the ability or deny ability for performing a specific action within an application on allowed resources based on certain allowed context (e.g., write emails @office, @work_days+@work_hours)

The system and method provide that authentication elements have the ability to have the manager(s) to predefine whether one or multiple of the multitude of authentication(s) is to be a one-time authentication or a persistent authentication. These one-time or persistent authentication(s) can be combined by having one or a multitude of one-time or persistent authentications, and can be used in a multitude of operations and resources where authentication is required (e.g. launching an app, reading a message, and other examples of authorizations herein disclosed.)

The system and method of the present disclosure further provide persistent authentication further comprised of one or a combination of passcodes, facial or hand gestures, device gesture, signature, biometrics (voice, fingerprint, facial recognition, retinal scan, etc.). Here, the authentication is performed in the device and these persistent authentications can be continuous with any predefined (by the user) protocol rules to how often the authentication is verified. The user has the authority and ability to temporarily suspend persistent authentication or override the frequency (time period) of authentication verification if they have all of the required authentication (user, operation, resource and context).

The system and method of the present disclosure further provided that computations are executed at the OS level, having the persistent authentication as a global variable (e.g., 'PUA@'). The preferred embodiment is as an authenticator daemon thread process that runs in the background. Each application, as it changes its context, queries the authenticator daemon for compliance with the protocol rules associated with each App.

For the system and method of the present disclosure, each application has its own authenticator daemon running in its 'sandbox' to validate its own operations and resources associated for each user on any given context {device, user, operation, resources, context} that could be granted/denied per device/user/operation/resource/context. The sensors associated with each protocol should be accessible by the App daemon.

In the system and method here disclosed, when any authentication/validation is not allowed, either at the user authentication level, operation authentication level, the resource authentication level, the context, or any other level, predefined resolution processes defined in the protocol are initiated. These processes may include any of the following, but not limited to:

(a) capture all: save the "state of the device" with all pertinent information related to the user, operation, resources, and context at the time of the failure.

(b) current context, current biometrics, take picture, take selfie, start video recording, start audio recording, record date-time stamp, record geolocation, record near networks, etc. wherein the system and method log the information above to local memory.

If the protocol has a flag to notify, the Log is sent to all stakeholders (defined in the protocol).

If the protocol has a flag to echo/display, relevant information (defined in the protocol) is displayed in one or many of the devices.

The system and method may further execute any other resolution processes that are uniquely associated with the devices/users/operations/resources/contexts. For example, close application, show cypher of message, delete data stream, sound alarm, etc.

With the system and method here disclosed, where the user has the option to customize the predefined rules in place to resolve (RESOLUTION) the failed device/user/operation/resource authorization. Multiple users are needed to be authorized simultaneously or sequentially for a given device/user/operation/resource/context to be authorized. For example, a) more than one user must be present, b) authorization from a manager or managers remotely (but persistently connected), etc. Where one or more of the required users are "electronic users" (e.g., a server needs to be active). The authorization context for these electronic users may be one of a multitude of mechanisms to evaluate the identity and "likeness" of the remote electronic user with a digital fingerprint. A preferred embodiment is to have pseudo-random number generator like the chaotic oscillator used in U.S. Pat. No. 9,853,809B2, "Method and Apparatus for Hybrid Encryption", that uses CHECK (Chaotic Hybrid Encryption Communication Kit), that is unique to the paired users.

With the system and method here disclosed, the authorization context limits the number of times an operation can be executed, e.g., message can be viewed 3 times before it self-destructs. The authorization context also limits the time when an operation is executed on a given resource, e.g., time-sensitive operation (e.g., user has 10 minutes to reply, student has an hour to complete the test). The user authorization context limits the number of other users being in near proximity (e.g., no other user is the view of the front camera, i.e., "shoulder-surfing"). Moreover, the user authorization context allows for timed allowance for authentication to be overwritten for specific scenarios (e.g., the user's face may leave the view of the camera for no more than 5 seconds, the gaze of the user can be off-screen for no more than 10 seconds, etc.) The settings for user authentication and context limits validation can be changed by manager (e.g., change the refresh rate for Face ID to 0.5 seconds, Face ID is used for authentication and face-tracking is used to guarantee authenticated face doesn't leave the camera view-this could be done to reduce power consumption).

With presently disclosed system and method, one device is used for the user authentication given a preselected protocol and context that authorizes the user to operate a second device or a group of devices. The other device(s) may use a different set of continuous authentication mechanisms to certify the authorized user(s) continue(s) to operate such device(s). (e.g., phone is used to authenticate the user with Face ID authorizing the user to operate a desktop computer app or a webpage, while the desktop computer's camera continuously validates that only the authenticated user is in view. Here, the secondary device(s) display(s) a QR code obtained through a cloud service or wireless communication from main device such that de main device can simultaneously authenticate the user (e.g., front camera Face ID) and read the QR code on a secondary device(s) (e.g., main device back camera).

For the present disclosure, the device transmits information (preferably) encrypted to a secondary device. Both devices use the persistent user authentication protocol to guarantee that the sender was authenticated to send the information (e.g., message) and the recipient was authenticated to receive the (encrypted) information. Only the authenticated recipient can access the transmitted information. Unauthorized users cannot send or receive messages. The devices transmitting information cannot be operated by unauthorized users. Moreover, the applications used in the devices transmitting information cannot be operated by unauthorized users.

For the system and method of the present disclosure, the transmitted information remains encrypted ("at-rest") when it is received by the recipient's device. The information is only decrypted (in real-time or near real-time) when the authenticated recipient is continuously or intermittently validated, and his/her gaze is fixed on the device's screen. The information sent to a recipient has incorporated digital information relating to the owner of the information and privileges that the owner gives to recipient based on a transmitted information non-disclosure agreement (TINDA) that the recipient acknowledges and accepts before receiving such information. Associated with the privileges, there is an agreed protocol to handle the privileges given to the recipient.

With the presently disclosed method and system, privileges can be modified by the owner at any time. These are enforced when the recipient attempts to access the relevant information. The information is stored in a server, temporarily or permanently. It remains encrypted and the recipient(s) has (have) access to it based on the specified protocol with the privileges of operations, resources, and contexts given by the manager or owner of the information. This can be used to perform collaboration between the owner and other user(s) as collaborator(s). For example, concurrently or sequentially editing a document. Information from other user(s) can be in terms of a license. This might be in the form of a lease to access the information (e.g., view a video/movie/video-lecture, or listen to an audio recording/music/podcast).

Access to the information from other user(s) can be in terms of a business transaction. This might be in the form of a sale of the information (e.g., purchase of an electronic book, movie, etc.) In such a case, modification of the new ownership of the information will follow established legal rules related to transfer of ownership of the information, like DRM (digital rights management). Where the information is multimedia and the main device enables playback in a secondary device (like earbuds for audio, visor or goggles for video, virtual reality apparatus for embedded presence, or a desktop or TV monitor.) The secondary device may be custom and associated with the main device such that the decryption occurs in the secondary device (e.g., earbuds). Likewise, the sound received in the earbuds microphone is encrypted in the earbuds before being sent to the main device for further transmission or storage.

With the presently disclosed system and method, the information is a document that requires signature (like a contract). The persistent user authentication validates that the authenticated and authorized user is the one performing the electronic signature. The legality of such signature(s) must obey the local governing laws for such transactions and must be agreed by all parties involved in the event. The device is used to receive information related to a multi-factor authentication process (e.g., access or authorization to operate a desktop App or WebApp) on a secondary device (e.g., desktop). This information might be a pin (digital alphanumeric string, passphrase, etc.) to be used to access a process. Only the authenticated user will have access to the information, instead of the holder of the device.

With the system and method here presented, the device is used to grant access to a secondary device (e.g., ATM, locked house, secure room, releasing laptop or tablet from dispenser, dinner box, Amazon Package in a locker). Only the authenticated user will be able to activate the access code, instead of the holder of the device. The communication to the secondary device could be via a certain set of allowable means enabled by the secondary device (e.g., Internet, Wi-Fi, wireless means like BLE, NFC, ZigBee, or even optically by flashing the main device camera flash.)

The system and method here presented provides that the information transmitted is encrypted using peer-to-peer and end-to-end encryption between sender and recipient(s) into an original-message payload. This payload is then encapsulated into a packet and sent to a proxy server. The information about the destination IP address is encapsulated in the message packet to the server, so it is not visible in the outgoing stream, and encrypted using peer-to-peer and end-to-end encryption between sender and proxy server. The server when the message is received decrypts the first layer of encryption (packet, it doesn't have enough information to decrypt the second layer of encryption.) At this point, the original-message is revealed—the original information remains encrypted. The IP of the destination is used to create a new packet to be sent to the destination. The payload is then encapsulated into a packet and encrypted using peer-to-peer and end-to-end encryption between proxy server and recipient, such that the true sender's IP is encapsulated in the packet, and it is not visible in the incoming stream to the recipient. Finally, the recipient receives the packet from the proxy server, decrypts the first layer recovering the original-message payload. At this point, it decrypts the message using the peer-to-peer and end-to-end encryption between sender and recipient.

The inventive system and method here disclosed provide that where instead of one unique proxy server, there is a farm of proxy servers. When sending a message, one of the proxy servers is selected randomly to perform the operation as described above. The system and method provides that when sending a message, one of the proxy servers is selected randomly to perform the operation as described above, but instead of sending the message [sender]-to-[proxy]-to-[recipient], there is an arbitrary number of proxy-servers chained in the transmission. For example, [sender]-to-[proxy_1]-to-[proxy_2]-to- . . . -to-[proxy_n]-to-[recipient]. Where n could be a fixed number or selected at random from a limited set.

Here the device is used to add a secondary device (e.g., smart watch, earbuds, etc.) to the set of devices used for the persistent user authentication. Only the authenticated user will be able to activate the access code, instead of the holder of the device. The communication to the secondary device could be via a certain set of allowable means enabled by the secondary device (e.g., camera, Internet, wireless means like BLE, or even optically by flashing the main device camera flash.) Once activated, the main device may have the ability to specify the parameters and sequence of functions the secondary device(s) perform(s). (e.g., a smartwatch can validate there is a "regular" pulse, monitor body temperature, and that it hasn't been removed).

The settings of PUA are themselves context-dependent. (e.g., "ultra-secure" for when outside the office, "secure" at home, "clear" inside my office.) Access to information is based on a certain (minimum) number of users from a prescribed set are accessing it simultaneously or almost simultaneously. There are a multitude of devices that are networked via one or various network protocols and mechanisms (e.g., mesh, BLE, radio, Zigby, cellular GSM, PCS, ad-hoc networks, LAN, Wi-Fi, G3, etc.). These devices share secure information from any of the devices as means of having a backup of the information in case one of the devices is compromised, deactivated, ceased/stolen, ransomed, lost, or destroyed. Some of the nodes may store information in a secure cloud server or in a multitude of cloud and/or private servers. In certain circumstances, a self-destruct command might be issued or executed from a timed-out counter if no update or communication with any node in the network occurs within a prescribed timeframe. Different devices may have active one or more network protocols and/or mechanisms and create a multitude of paths for the information to be distributed. For example, a device may belong to a BLE network and a Zigby network simultaneously, sending, receiving, and/or relaying the information being shared.

The system and method function such that where any of the nodes might transmit outside the mesh network to another device in a different network. For example, if an authoritarian regime blocks Wi-Fi in a region, smartphones may create a network where some smartphones (nodes) are outside the network blockade and transmit the information out. The information may be, but is not restricted to photos, images, documents, streaming or recorded videos or sound. The source of the information may also attach with the data, there may be geolocation, date-time stamp, etc. For example, a journalist transmitting video from an area where the cell towers and Wi-Fi have been turned off.

When sending a message, the sender can specify to be received "silent," not alerting the recipient that a new message has arrived. When sending a message, the sender can specify a haptic event or sequence of events are initiated. (e.g., make a specific sound, vibrate, flash, etc.). When receiving a message, the recipient can specify a haptic event or sequence of events are initiated based on certain context. (e.g., vibrate differently depending on who sent the message, Flash certain patterns or make a specific sound if the message is labeled urgent.)

After the user is authenticated, a gesture is used to issue a command or operation. (e.g., triple blink is "kidnap alert," where the phone is locked, the phone calls 911 and starts recording video and streaming to a server with geolocation. A shake closes the app and goes into "safe mode.") After the user is authenticated, a gesture is used to issue a self-destruct command or operation. In this case all the information in the phone, or application, or media is erased. Furthermore, if the device or group of devices associated with the authenticating device are enabled with physical self-destruct mechanisms, they might be activated. These actions may be paired with or sequenced according to specified conflict resolution presets in this specification. For example, disable a vehicle, burn an IC in a companion electronic device.

The main device is a mobile device and the operating system obfuscates certain selected apps (makes them invisible) if an unauthorized person is using the device. Or certain documents within an application are obfuscated. For example, images designated "personal" or "top secret" are not visible if the persistent user authentication doesn't validate the user. The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

It should be understood that components shown in figures are provided for illustrative purposes only and should not be construed in a limited sense. A person skilled in the art will appreciate alternate components that might be used to implement the embodiments of the present invention and such implementations will be within the scope of the present invention.

While preferred embodiments have been described above and illustrated in the accompanying drawings, it will be evident to those skilled in the art that modifications may be made without departing from this invention. Such modifications are considered as possible variants comprising the scope of the invention.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs.

Further, certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

What we claim:

1. A computing device or a server for authorizing a set of permitted operations on allowable associated circuits in associated electronic devices, comprising:
    circuitry, computer processors, and computer processor instructions, executable computer operation instructions and data, and password and/or biometric persistent user authentication algorithms;
    wherein said computing device or server system provides a set of permitted operations further comprising a set of operating system level functions on an associated electronic device and on an identified application on said associated electronic device,
    wherein said set of authorization operations occur on circuitry, said circuitry comprising:
        circuitry and executable instructions for authorizing a specified user input through at least one potentially heterogeneous electronic devices having potentially different computational capabilities;
        a plurality of sensors distributed among said at least one electronic devices;
        an accessibility/authorization protocol for providing rules for authentication and validation of said plurality of electronic devices, user interfaces, executable instructions and data, resources and contacts
        firmware for executing instructions and processing data for authenticating a plurality of user inputs having a plurality of authentication elements, said authentication elements for performing said authentication operation in a remote device with authentication relayed via secure encrypted means, and further whereby said authentication operation is performed in an external device is passive, comprising a beacon or RFID tag, for interacting with one or more of the devices for authentication and/or context validation;
    wherein said set of authorization operations comprise instructions and data for use of a hierarchy of layers, said hierarchy of layers comprising
        a user authentication layer operating on said associated electronic device;
        a validation layer for validating an intended operation from a set of authorized operations;
        a contextual layer for allowing said set of authorized operations only under a set of specified contexts, including geo-location, date and time contexts;

an allowable resource layer for allowing said set of authorized operations according to allowable resources from a set comprising data, information, messages, audio data, image data, files and media; and a resolution layer for executing a plurality of resolution operations when an authentication operation fails according to a predetermined hierarchy of actions, said hierarchy actions depending upon the state of said computing device or said server and said associated electronic device, wherein said plurality of resolution operations comprises termination of said set of authorized operations by obfuscating said set of authorized operations from being accessed upon failing said authentication operation, and wherein said obfuscating comprises converting said set of authorized operations into an unreadable format of said set of authorized operations.

2. The server of claim 1, further comprising authentication elements grouped for multi-factor simultaneous authentication and/or authorization, said authentication elements comprising multi-step authentication and/or authorization process for creating a sequence of methods according to a group of predefined settings that may depend on availability and status of devices, sensors and environmental conditions.

3. The server of claim 1, further comprising authentication elements including, but are not limited to one or a combination of passcodes, facial or hand gestures, device gesture, signature, biometrics, from the group comprising voice, fingerprint, facial recognition, and retinal scan.

4. The server of claim 1, further comprising authentication elements according to a set of predefined user preferences for providing user or user group authorizations.

5. The server of claim 4, further comprising authentication elements for granting access to or deny access to using the electronic devices.

6. The server of claim 4, further comprising authentication elements for granting access to or deny access to perform an operation.

7. The server of claim 4, further comprising authentication elements for granting the ability or deny ability for executing specific action within an application.

8. The server of claim 4, further comprising authentication elements for granting the ability or deny ability for performing a specific action within an application on allowed resources.

9. The server of claim 4, further comprising authentication elements for granting the ability or deny ability for performing a specific action within an application on allowed resources based on certain allowed context.

10. The server of claim 4, further comprising authentication elements for predefining whether one or multiple of the multitude of authentication(s) is to be a one-time authentication or a persistent authentication, said one-time or persistent authentication(s) combinable by having one or a multitude of one-time or persistent authentications, and useable in a multitude of operations and resources where authentication is required.

11. The server of claim 1, further comprising persistent authentication further comprising one or a combination of passcodes, facial or hand gestures, device gesture, signature, biometrics from the group consisting of voice, fingerprint, facial recognition, and retinal scan, wherein an authentication is performed in the device and a plurality of persistent authentications formed to be continuous with any user predefined protocol rules to how often the authentication is verified, and further comprising user instructions for providing authority and ability to temporarily suspend persistent authentication or override how often said authentication verification occurs if they have required authentication, wherein said required authentication comprises authentication of user, operation, resource and context.

12. A method for authorizing a set of authorized operations on allowable associated circuits in associated electronic devices, comprising:

providing circuitry, computer processors, and computer processor instructions, executable computer operation instructions and data, and password and/or biometric persistent user authentication algorithms;

providing, by a computing device or a server, a set of authorized operations further comprising a set of operating system level functions on an associated electronic device and on an identified application on said associated electronic device, operating said set of authorization operations to occur on said circuitry, authorizing said circuitry and said executable instructions for a specified user input through at least one potentially heterogeneous electronic devices having potentially different computational capabilities;

providing a plurality of sensors distributed among said at least one electronic device;

providing rules for an accessibility/authorization protocol for authentication and validation of said plurality of electronic devices, user interfaces, executable instructions and data, resources and contacts;

providing a firmware for executing instructions and processing data for authenticating a plurality of user inputs having a plurality of authentication elements, said authentication elements for performing said authentication operation in a remote device with authentication relayed via secure encrypted means, and further whereby said authentication operation is performed in an external device is passive, comprising a beacon or RFID tag, for interacting with one or more of the devices for authentication and/or context validation;

performing said set of authorization operations comprise instructions and data for use of a hierarchy of layers, for:

operating on said associated electronic device;

validating an intended operation from a set of authorized operations;

allowing said set of authorized operations only under a set of specified contexts, including geo-location, date and time contexts;

allowing, said set of authorized operations according to allowable resources from a set comprising data, information, messages, audio data, image data, files and media; and executing a plurality of resolution operations when an authentication operation fails according to a predetermined hierarchy of actions, said hierarchy actions depending upon the state of said server and said associated electronic device, said plurality of resolution operations comprising terminating said set of authorized operations by obfuscating said set of authorized operations from being accessed upon failing said authentication operation, said obfuscating comprising converting said set of authorized operations into an unreadable format of said set of authorized operations.

13. The method of claim 12, further comprising grouping said authentication elements for multi-factor simultaneous authentication and/or authorization, said authentication elements comprising multi-step authentication and/or authorization process for creating a sequence of methods according to a group of predefined settings that may depend on availability and status of devices, sensors and environmental conditions.

14. The method of claim 12, further providing said set of authentication elements to include, but not be limited to one or a combination of passcodes, facial or hand gestures, device gesture, signature, biometrics, from the group comprising voice, fingerprint, facial recognition, and retinal scan.

15. The method of claim 12, further providing said authentication elements according to a set of predefined user preferences for providing user or user group authorizations.

16. The method of claim 15, further providing said authentication elements for granting access to or deny access to using the electronic devices.

17. The method of claim 15, further comprising the steps of granting access to or deny access to perform an operation.

18. The method of claim 15, further comprising the step of granting the ability or deny ability for executing specific action within an application.

19. The method of claim 15, further comprising the step of granting the ability or deny ability for performing a specific action within an application on allowed resources.

20. The method of claim 15, further comprising the step of granting the ability or deny ability for performing a specific action within an application on allowed resources based on certain allowed context.

21. The method of claim 15, further comprising the step of predefining whether one or multiple of the multitude of authentication(s) is to be a onetime authentication or a persistent authentication, said one-time or persistent authentication(s) combinable by having one or a multitude of one-time or persistent authentications, and useable in a multitude of operations and resources where authentication is required.

22. The method of claim 12, further comprising the step of providing persistent authentication further comprising one or a combination of passcodes, facial or hand gestures, device gesture, signature, biometrics from the group consisting of voice, fingerprint, facial recognition, and retinal scan, wherein an authentication is performed in the device and a plurality of persistent authentications formed to be continuous with any user predefined protocol rules to how often the authentication is verified, and further comprising user instructions for providing authority and ability to temporarily suspend persistent authentication or override how often authentication verification occurs if they have required authentication, wherein said required authentication comprises authentication of user, operation, resource and context.

* * * * *